United States Patent
Minami et al.

(10) Patent No.: US 6,954,704 B2
(45) Date of Patent: Oct. 11, 2005

(54) DIGITAL PROTECTION AND CONTROL DEVICE

(75) Inventors: Yuuji Minami, Machida (JP);
Noriyoshi Suga, Hachioji (JP); Hiromi Nagasaki, Saitama (JP); Masayuki Kosakada, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 21 days.

(21) Appl. No.: 10/608,377

(22) Filed: Jun. 30, 2003

(65) Prior Publication Data

US 2004/0027750 A1 Feb. 12, 2004

(30) Foreign Application Priority Data

Aug. 6, 2002 (JP) ........................................ 2002-229102

(51) Int. Cl.⁷ ................................................ G05D 3/12
(52) U.S. Cl. ........................... 702/62; 702/57; 702/60; 702/65; 702/72; 702/79; 700/295; 700/292
(58) Field of Search ............................... 702/57–62, 64, 702/65, 72, 76, 77, 79; 700/19–22, 79, 82, 286–298; 361/601, 602, 605, 622, 62; 340/870.3, 500

(56) References Cited

U.S. PATENT DOCUMENTS

| | | | |
|---|---|---|---|
| 5,995,911 A | * 11/1999 | Hart | 702/64 |
| 6,285,917 B1 | * 9/2001 | Sekiguchi et al. | 700/239 |
| 6,405,104 B1 | 6/2002 | Dougherty | |
| 6,571,153 B1 | * 5/2003 | Maeda et al. | 700/292 |
| 6,618,648 B1 | * 9/2003 | Shirota et al. | 700/291 |
| 2002/0116092 A1 | * 8/2002 | Hamamatsu et al. | 700/295 |

FOREIGN PATENT DOCUMENTS

| | | |
|---|---|---|
| EP | 0 384 435 | 8/1990 |
| JP | 2002-315233 | 10/2002 |
| WO | WO 02/054562 | 7/2002 |

OTHER PUBLICATIONS

C. Brunner, et al., Cigré Session 2000, 34–106, 9 pages, "Serial Communication Between Process and Bay Level", 2000.

* cited by examiner

Primary Examiner—Carol S. W. Tsai
(74) Attorney, Agent, or Firm—Oblon, Spivak, McClelland, Maier & Neustadt, P.C.

(57) ABSTRACT

A digital protection and control device is so configured that at least parts of a digital data merging unit coupled to sensor units by a transmission medium, a protection and control unit, a communication unit for component control devices coupled to component control devices by a transmission medium, and a process bus communication unit are coupled by a parallel transmission medium, and at least a part of data exchange is based on a multimaster mode. Transmission based on the multimaster mode enables each unit to transmit/receive data independently and enables the reduction in unbalanced communication load. As a result, such a risk can be reduced that time responsiveness of operation is lowered as the entire digital protection and control device due to unbalanced concentration of data bus processing in a particular unit.

12 Claims, 19 Drawing Sheets

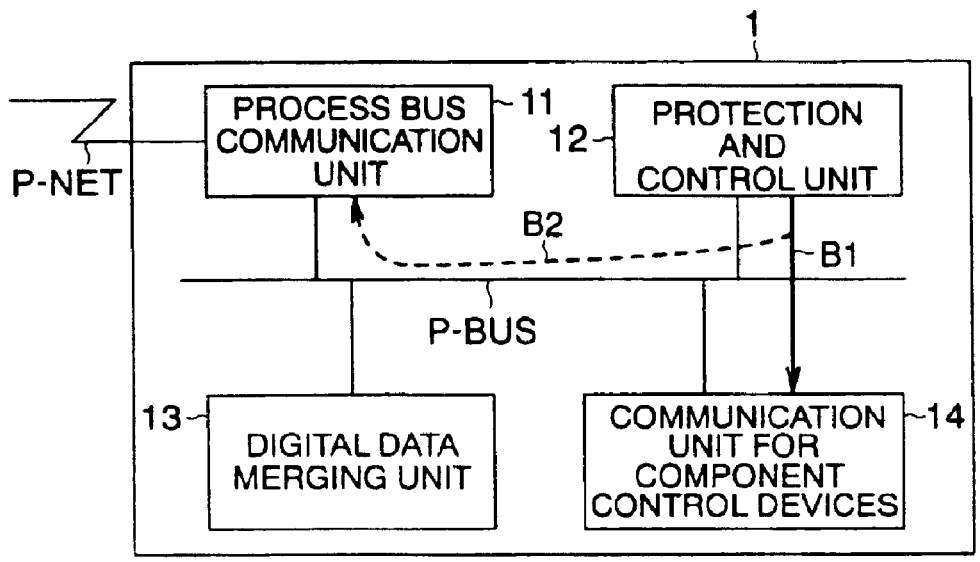
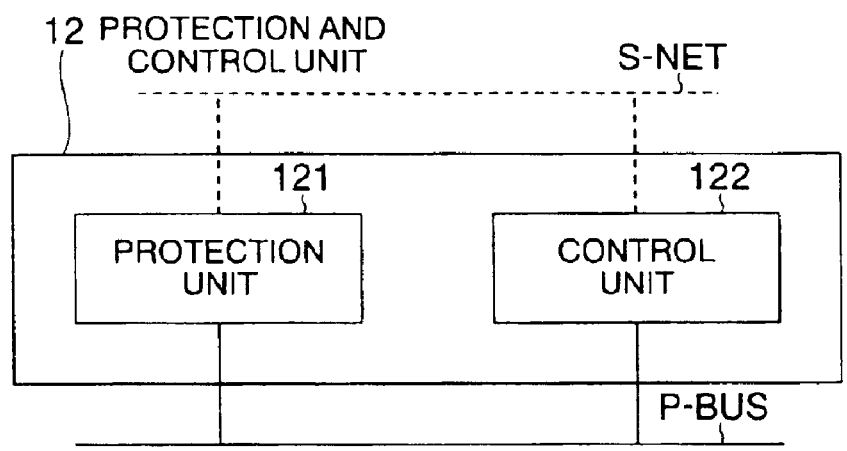

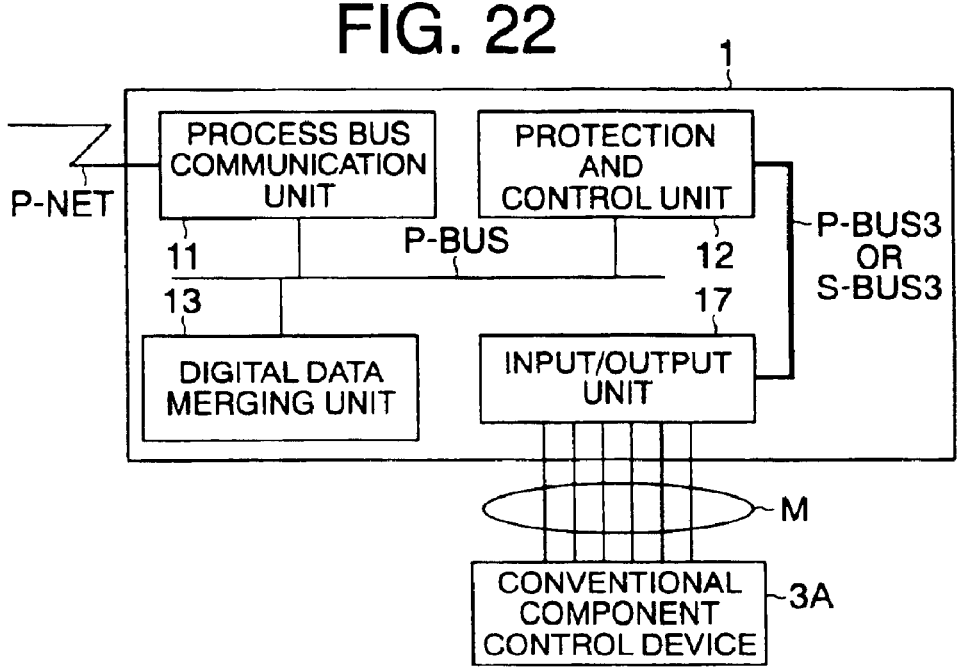
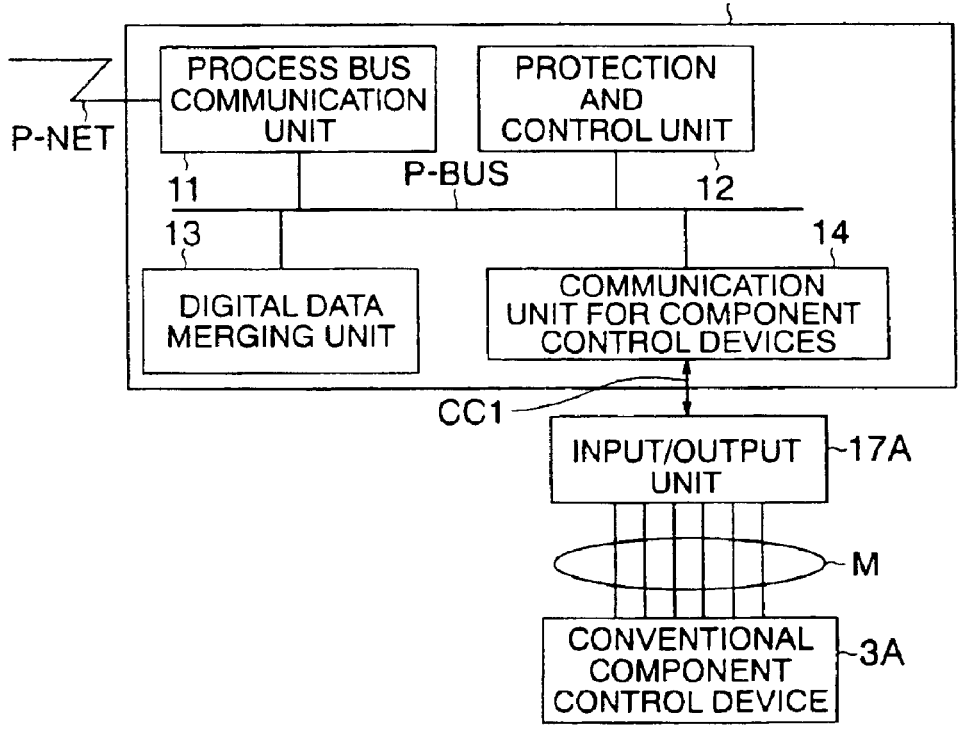

DIGITAL PROTECTION AND CONTROL DEVICE

CROSSREFERENCE TO RELATED APPLICATIONS

This application is based upon and claims the benefit of priority from the prior Japanese Patent Application No. 2002-229102 filed on Aug. 6, 2002; the entire contents of which are incorporated herein by reference.

BACKGROUND OF THE INVENTION

1. Field of the Invention

The present invention relates to a digital protection and control device to which a digital sensor unit detecting AC electricity quantities of substation main equipment and outputting the detected quantities in digital values and a component control device controlling the substation main equipment are coupled via a transmission medium.

2. Description of the Related Art

A conventional protection and control system in a substation is shown in FIG. 1. In accordance with the recent development of communication and digital technology, some of protection and control systems in substations also use devices to which digital arithmetic processors and transmission mediums are applied.

In FIG. 1, Z1 shown by a frame depicted with a dot-dash line is a main control building of a substation. In the main control building Z1, a remote controlling equipment Z2 that relays information to/from a remote control station, a collective controlling-and-monitoring equipment Z3 that performs supervisory control of the entire substation, and main-circuit control devices Z5-1 to Z5-$n$ installed for respective main-circuits such as power-transmission lines are coupled by a station bus Z7 (a serial transmission bus such as LAN). Further, protection devices Z6-1 to Z6-$n$ to protect respective substation equipments Z8-1 to Z8-$n$, which will be described later, are connected to the main-circuit control devices Z5-1 to Z5-$n$ respectively. Note that the remote controlling equipment Z2 and the collective controlling-and-monitoring equipment Z3 will collectively be referred to as a substation controlling-and-monitoring equipment Z4 for convenience sake.

The substation main equipments Z8-1 to Z8-$n$ are connected to the main-circuit control devices Z5-1 to Z5-$n$ and the protection devices Z6-1 to Z6-$n$ via local control devices Z9-1 to Z9-$n$. The substation main equipment Z8-1, which is a kind of facility for power transmission lines, is constituted of a current instrument transformer Z10, a voltage instrument transformer Z11, a switchgear Z12 such as a circuit breaker or a disconnecting switch, a bus line Z13, and a power transmission line Z14.

The current instrument transformer Z10, the voltage instrument transformer Z11, the switchgear Z12, and the local control device Z9-1 are devices to which analog technology is applied. For connection between the substation main equipment Z8-1 and the local control device Z9-1, and between the local control device Z9-1 and the main-circuit control device Z5-1 or the protection device Z6-1, electric cables Z15 and Z16 appropriate for a volume of transmitted information are used.

Digital devices to each of which a digital arithmetic processor is applied are used as the remote controlling equipment Z2, the collective controlling-and-monitoring equipment Z3, the main-circuit control devices Z5-1 to Z5-$n$, and the protection devices Z6-1 to Z6-$n$. The station bus Z7 is used as a transmission medium for information transmission between the substation controlling-and-monitoring equipment Z4 (the remote controlling equipment Z2 and the collective controlling-and-monitoring equipment Z3) and the main-circuit control devices Z5-1. An electric cable Z17 appropriate for a volume of transmitted information is often used for connection between the main-circuit control device Z5-1 and the protection device Z6-1, a contact being an interface.

Each of the main-circuit control devices Z5-1 to Z5-$n$ is constituted of an input converter unit, an input unit, an output unit, an analog input unit, an arithmetic unit, a communication unit, and a power supply unit. The input converter unit takes in an AC electricity quantity of a current or a voltage, and filters and A/D converts the analog input so that the analog input is converted to a voltage value or a current value on a level directly treatable in an electronic circuit. A contact input circuit is mounted on the input unit. A contact output circuit is mounted on the output unit. The analog input unit performs processing such as digital conversion of the AC electricity quantities. The arithmetic unit performs processing for realizing a control function. The communication unit performs transmission processing. The power supply unit supplies electricity to each of the units.

Likewise, each of the protection devices Z6-1 to Z6-$n$ is also constituted of an input converter unit, an input unit, an output unit, an analog input unit, an arithmetic unit, a communication unit, and a power supply unit. The input converter unit takes in an AC electricity quantity of a current or a voltage and converts it to a voltage value or a current value on a level directly treatable in an electronic circuit. A contact input circuit is mounted on the input unit. A contact output circuit is mounted on the output unit. The analog input unit performs processing such as digital conversion of the AC electricity quantities. The arithmetic unit performs processing for realizing a protection function. The communication unit performs transmission processing. The power supply unit supplies electricity to each of the units.

A plurality of input units and a plurality of output units are mounted on each of the main-circuit control devices Z5-1 to Z5-$n$ and the protection devices Z6-1 to Z6-$n$ when necessary. Therefore, each of the main-circuit control devices Z5 and the protection devices Z6 has such a configuration that the units involved in input and output occupy most of each device.

SUMMARY OF THE INVENTION

In conventional protection and control systems, since analog information transmitted through electric cables is used for information transmission between substation main equipments and protection and control devices that protect and control these substation main equipments, contact input circuits and contact output circuits handling a relatively large voltage and current have been required. Further, a space for disposing a large number of electric cables is necessary, and a protection unit and a control unit need to be accommodated in independent cases provided exclusively for the respective units, which has been a cause of the increase in installation space of the devices.

Moreover, in protection and control systems in substations, various concrete functions and processing configurations are necessary in order to improve protection and control performance thereof.

It is an object of the present invention to provide a digital protection and control device configured to realize reduction in installation space thereof by the digitalization of the device, and to realize improvement in protection and control performance by efficient data exchange in the device.

In order to attain the abovementioned object, according to an aspect of the present invention, there is provided a digital protection and control device including: a digital data merging unit configured to receive, via a transmission medium, digital output from one sensor unit or a plurality of sensor units detecting AC electricity quantities of main circuits of substation main equipment and to merge the inputted digital data; a protection and control unit configured to output a control signal for protection and control of the substation main equipment based on the digital data outputted from the digital data merging unit; a communication unit for component control devices configured to transmit to the protection and control unit component monitor data outputted from one component control device or a plurality of component control devices controlling the substation main equipment, and to transmit the control signal outputted from the protection and control unit to the component control device(s), the component monitor data and the control signal being transmitted via a transmission medium; a process bus communication unit configured to relay data to/from at least a part of the protection and control unit, the communication unit for component control devices, and the digital data merging unit from/to an external process bus; and a parallel transmission medium configured to couple at least parts of the digital data merging unit, the protection and control unit, the communication unit for component control devices, and the process bus communication unit to one another, wherein data exchange among at least parts of the digital data merging unit, the protection and control unit, the communication unit for component control devices, and the process bus communication unit is based on a multimaster mode or on a single master mode.

BRIEF DESCRIPTION OF THE DRAWINGS

FIG. 6 is a schematic view showing a second concrete example of the multimaster transmission mode.

FIG. 7 is a block diagram showing an example of function distribution of a protection and control unit.

FIG. 22 is a block diagram showing a second example of the functional configuration of the ninth embodiment.

FIG. 23 is a block diagram showing an example of the functional configuration of a tenth embodiment.

DESCRIPTION OF THE EMBODIMENTS

To begin with, a reference example which will be of some help in understanding embodiments of the present invention will be explained.

Figure 2:
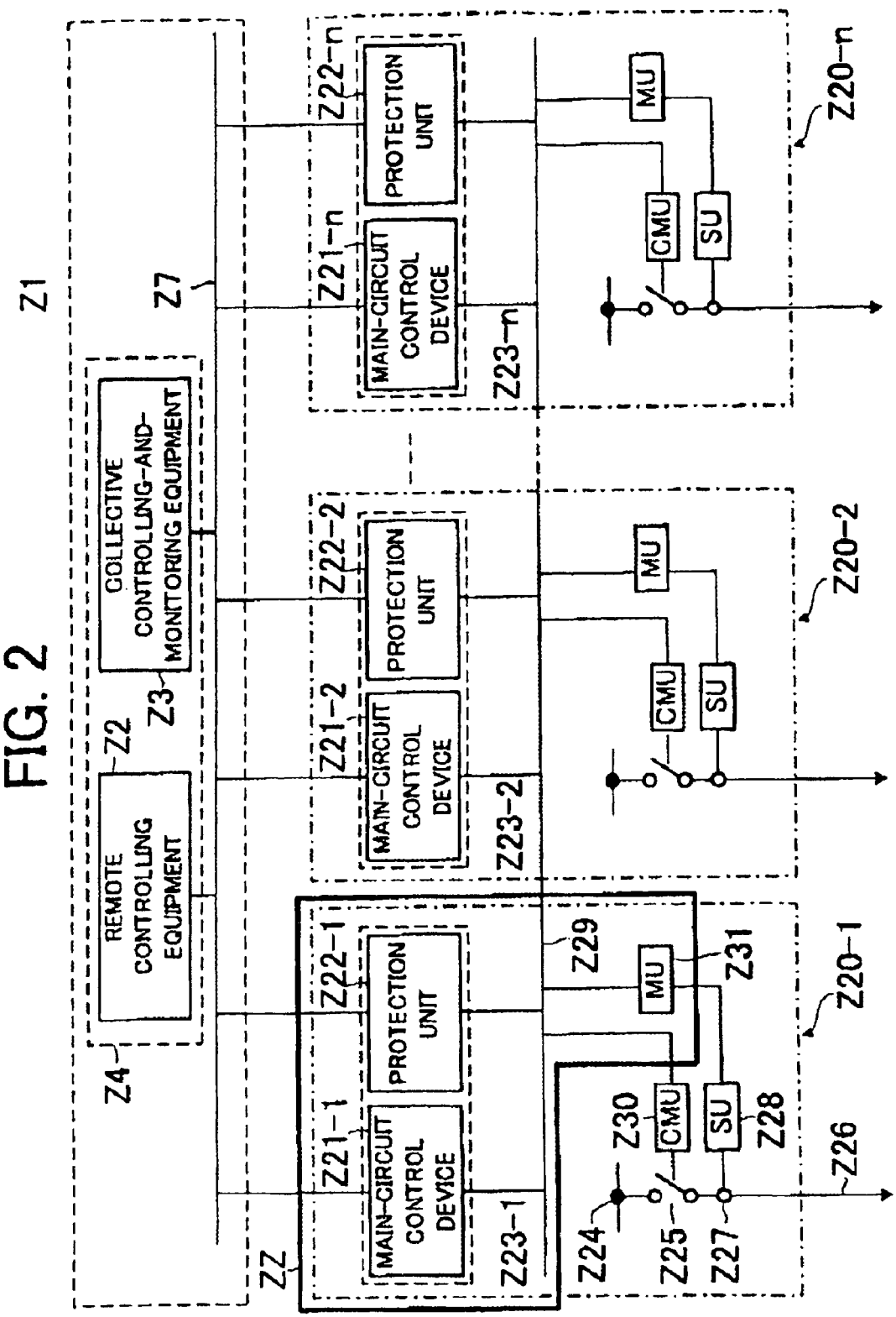
FIG. 2 is a block diagram showing a configuration example of a system for protecting and controlling substation main equipment in which components are coupled by a transmission medium.

The inventors have devised such configuration that the system configuration shown in FIG. 2 and constituent units thereof are incorporated in or installed near substation main equipment (Japanese Patent Application: Patent Application No. 2001-033833). Incidentally, this configuration had not been laid open when the application of the present invention was filed in Japan, and therefore is not considered as a prior art of the present invention.

In this drawing, Z1 denotes a main control building of a substation or the like, in which installed is a substation controlling-and-monitoring equipment Z4 constituted of a remote controlling equipment Z2 that relays information to/from remote places to be controlled and a collective controlling-and-monitoring equipment Z3 that performs supervisory control of the entire substation.

Via a station bus Z7, these remote controlling equipment Z2 and collective controlling-and-monitoring equipment Z3 are coupled to each other and coupled to protection and control units Z23-1 to Z23-n in respective systems Z20-1 to Z20-n for protecting and controlling substation main equipment. The protection and control unit Z23-1 is constituted of a main-circuit control unit Z21-1 and a protection unit Z22-1 each connected to the station bus Z7.

The systems Z20-1 to Z20-n for protecting and controlling substation main equipment are installed in the substation for respective main-circuits of power transmission lines, for a bus line coupler circuit and a bus line section circuit which are not shown, on a primary side, a secondary side, and a tertiary side of a not-shown voltage transformer circuit, or the like. Each of the systems Z20-1 to Z20n for protecting and controlling substation main equipment is constituted of a substation main equipment (also called main circuit components), a instrument transformer as an electricity quantity detector, and various other components, which will be described later.

As an example of the substation main equipment, a main-circuit for power transmission lines of a gas-insulated switchgear (GIS) is shown. The main-circuits of the respective systems for protecting and controlling substation main equipment have similar configurations to one another, and therefore, the configuration explanation will be given using the system Z20-1 for protecting and controlling substation main equipment and the other systems will be omitted in the explanation and the drawing.

The substation main equipment is constituted of a bus line Z24, a switchgear Z25 such as a circuit breaker, a disconnecting switch, or an earthing switch, and a power transmission line Z26. An AC current flowing through the substation main equipment and an AC voltage applied thereto are extracted by the instrument transformer (or called as an electricity quantity detector) Z27 installed in a prescribed portion, and this extracted analog electricity quantity is inputted to a sensor unit (SU) Z28 and outputted as digital data after being analog/digital converted.

Generally, the plural sensor units Z28 are provided, and the plural pieces of digital data outputted from these sensor units Z28 are merged in a digital data merging unit (MU) Z31, undergo a correction process and the like if necessary. Thereafter, the digital data is transmitted to a process bus (a serial transmission bus such as LAN) Z29 and further taken into the aforesaid main-circuit control unit Z21-1 and protection unit Z22-1 to be used in arithmetic operation for monitoring, controlling, and protecting the substation main equipment.

Each control command to the substation main equipment (a so-called downward information) from the main-circuit control unit Z21-1 and protection unit Z22-1, or from the central supervisory device Z3 of the main control building is received in a component control device (CMU) Z30 via the process bus Z29. Based on the received control command, the component control device Z30 monitors and controls the substation main equipment, transmits a break command to the switchgear Z25, and so on.

Figure 1:
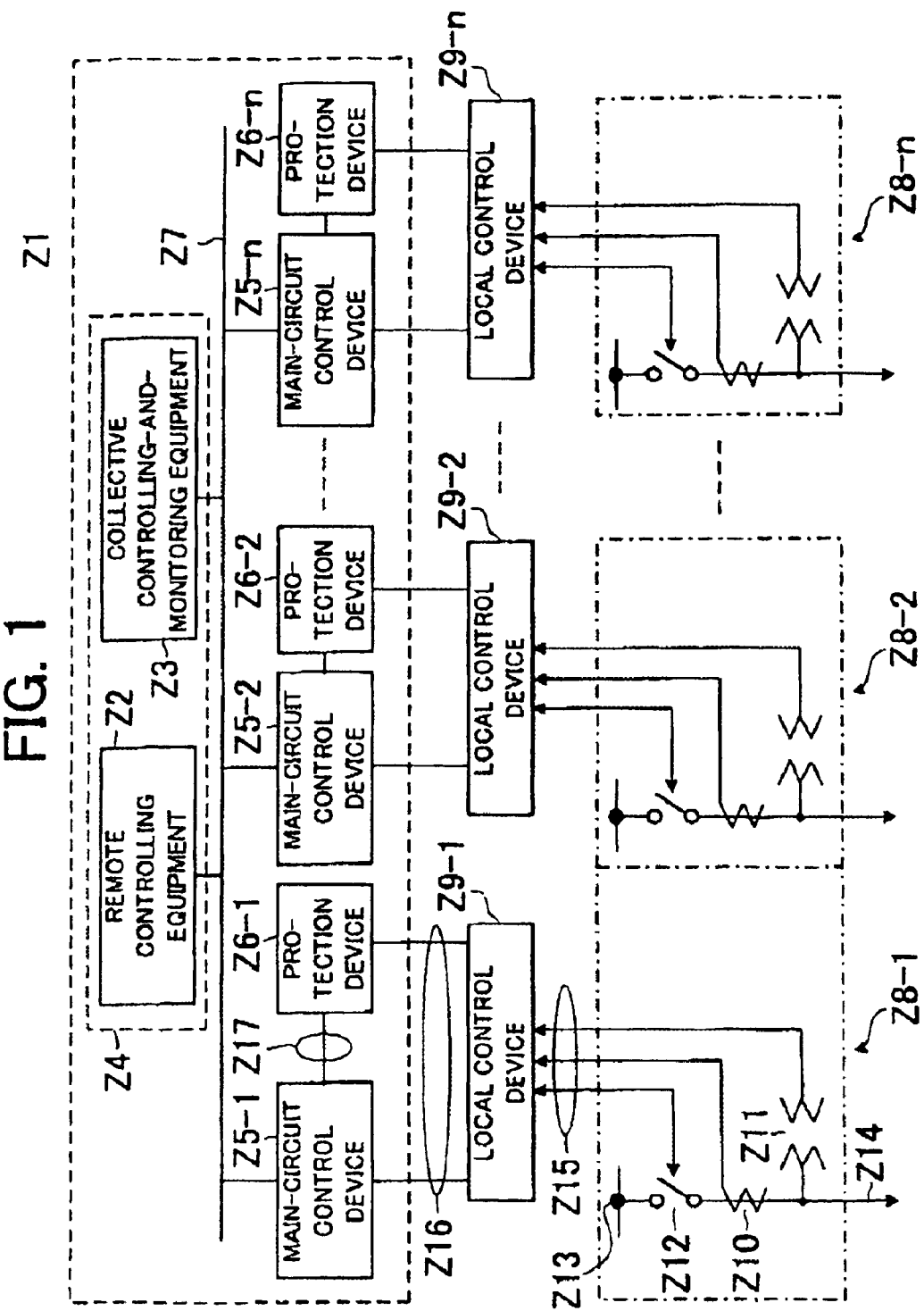
FIG. 1 is a block diagram showing a configuration example of a conventional system for protecting and controlling substation main equipment provided in a substation.

In this configuration, the local control devices (the reference symbols Z9-1 to Z9-n in FIG. 1) are eliminated and the function thereof is distributed to the main-circuit control unit Z21-1, the sensor unit Z28, the digital data merging unit Z31, the component control device Z30, and so on.

In the above-described system, almost all the main-circuits and devices constituting the system including a driving circuit of the substation main equipment and circuits of current and voltage instrument transformer can be digitalized. Consequently, they can be coupled to one another by a transmission medium in which electric cables are reduced to a greater extent than in the case of analog technology. It is also possible to make the system compact, which enables the system to be directly incorporated in or installed near the substation main equipment.

In addition, in order to make it easy to ensure protection and control performance, a portion denoted by the reference symbol ZZ in FIG. 2 can be so configured that a parallel bus is used in all or a part of the aforesaid transmission medium Z29 and is coupled to the transmission medium for the digital data merging unit Z31 (or the sensor unit Z28), the protection and control unit Z23-1, and the component control device Z30.

The foregoing is a reference example which will be of some help in understanding the embodiments of the present invention.

Here, in order to further improve the protection and control performance of the protection and control systems in the substation, various concrete functions and processing configurations are required.

In the embodiments of the present invention described below, owing to efficient data exchange in the device, the protection and control performance of the digital protection and control system can be further improved.

(Configuration of First Embodiment)

Hereinafter, an embodiment of the present invention will be explained with reference to the drawings.

Figure 3:
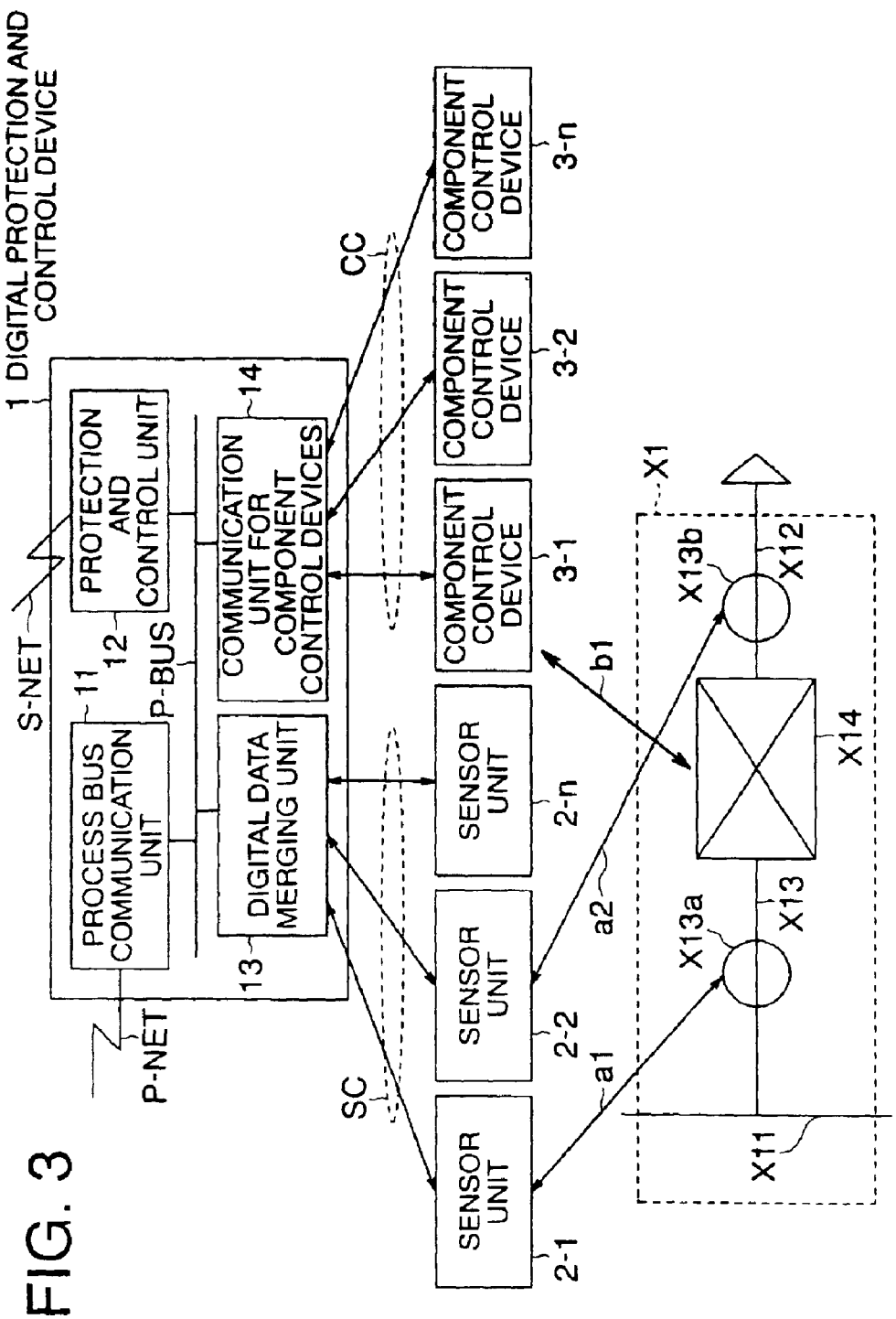
FIG. 3 is a block diagram showing an example of the functional configuration and system configuration of a first embodiment.

FIG. 3 is a configuration diagram showing a first embodiment of a digital protection and control system according to the present invention.

The digital protection and control device 1 shown in FIG. 3 is constituted of a process bus communication unit 11, a protection and control unit 12, a digital data merging unit 13, and a communication unit 14 for component control devices. All of these process bus communication unit 11, protection and control unit 12, digital data merging unit 13, communication unit 14 for component control devices are coupled to one another by a parallel transmission medium P-BUS, and digital data exchange among these units 11 to 14 is partly or entirely based on a multimaster transmission mode.

In the multimaster transmission mode, when there are two or more units connected to a data bus, both units are capable of acquiring a bus control right, and the one acquiring the bus control right is defined as a master (a parent station) in communication and a communication opposite not acquiring the bus control right is defined as a slave (a child station). At this time, data transmission/reception access (write-access to data and read-access to data) by the master side to the slave side is permitted, but data transmission/reception access (write access to data and read access to data) by the slave side to the master side is restricted or prohibited.

The parallel bus is applied to portions transmitting/receiving data that requires realtime performance of protection and control (for example, portions transmitting/receiving data on instantaneous values of AC electricity quantities of main circuits of the substation main equipment, a transmission line for an open/close command to switchgears at the time of fault detection by a protective relay, and so on) so that time performance can be ensured. All of the units 11 to 14 in the device may be connected to one another by the parallel bus.

The digital data merging unit 13 receives digital data outputted from sensor units 2-1 to 2-n via a point-to-point transmission path SC and merges the digital data. The sensor units 2-1 to 2-n take in the AC electricity quantities of the main circuits of the substation main equipment X1 having a bus line X11 installed in an electric power station to convert these quantities to digital data and output the digital data.

Here, the reference symbol a1 denotes an electricity quantity extracted by a current instrument transformer X13a installed in a power transmission line X13 and the reference symbol a2 denotes an electricity quantity extracted in a current instrument transformer X13b installed in a power transmission line X12. The reference symbols from a1 to an should be shown, but for convenience of explanation, only the reference symbols a1 and a2 are shown in FIG. 3. The transmission path SC is, for example, a half-duplex communication path configured for serial transmission/reception with one communication path or a full-duplex communication path configured to allot one exclusive line for each of transmission and reception.

The reference symbol b1 denotes a control output (downward signal) for controlling a circuit breaker X14 and a component status value (upward signal). Thereinafter, the reference symbol is called "data b1". Only the data b1 is shown in FIG. 3 for convenience of explanation, though the data b1 to bn should be shown corresponding to the plural circuit breakers X14, disconnecting switches, earthing switches, and so on.

The protection and control unit 12 takes in the digital data outputted from the digital data merging unit 13 to monitor, control, and protect the substation main equipment X1, and communicates with a substation controlling-and-monitoring equipment of a higher order via a station bus S-NET.

The communication unit 14 for component control devices takes in the data b1 of component monitoring via a point-to-point transmission path CC from component control devices 3-1 to 3n that control the substation main equipment X1 and transmits the digital data to the protection and control unit 12 while relaying a control signal from the protection and control unit 12 to the component control devices 3-1 to 3-n via the point-to-point transmission path CC.

The point-to-point transmission path CC is, for example, a half-duplex communication path configured for serial transmission/reception with one communication path or a full-duplex communication path configured to allot one exclusive line for each of transmission and reception.

The process bus communication unit 11 relays digital data transmitted to/from all or a part of the protection and control unit 12, the digital data merging unit 13, and the communication unit 14 for component control devices from/to a process bus P-NET laid in the premises of the aforesaid electric power station.

As the current instrument transformers X13a and X13b, for example, a Rogowski coil or an optical current instrument transformer is applicable in order to convert the electricity quantities to low voltage signals (analog signal) or optical signals which are easy to handle in a sensor unit having an electronic circuit. This realizes downsizing and simplification of the sensor units. The current instrument transformers used in this embodiment, however, are not limited to those described above. The current instrument transformers X13a and X13b may also be replaced by voltage instrument transformers.

Next, an installation example of the digital protection and control device 1 will be shown.

Figure 4:
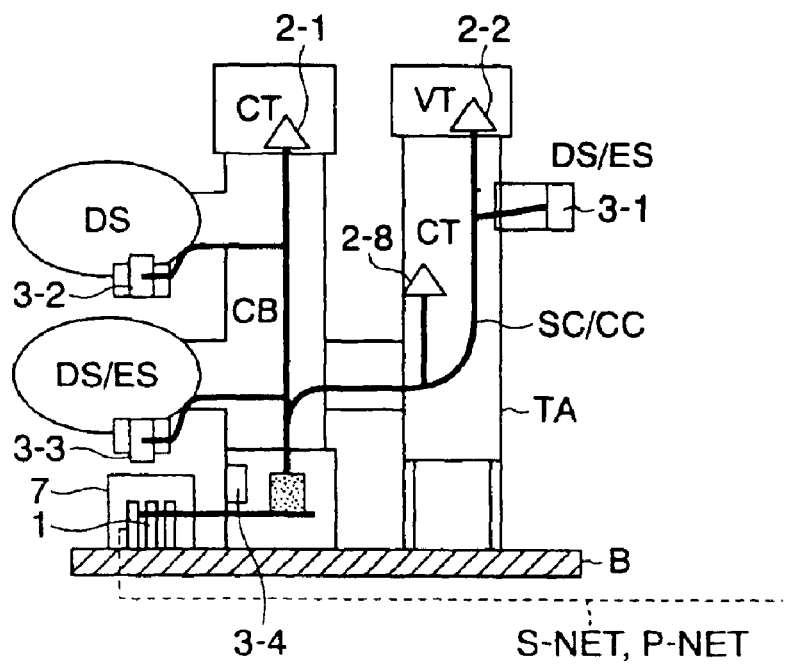
FIG. 4 is a schematic block diagram showing an example of substation equipment and an installation state thereof.

FIG. 4 is a diagram showing an example of the layout (positional relation) when the substation main equipment is disposed in a GIS. This drawing shows how the sensor units 2-1, 2-2, the component control devices 3-1 to 3-4, and the digital protection and control device 1 are arranged relatively to the GIS, and how they are connected to the process bus P-NET and the station bus S-NET constituted of a serial transmission medium such as LAN (Ethernet).

A metal container (hereinafter, this metal container will be referred to as a 'tank') TA accommodating main circuit components such as a circuit breaker (CB), a disconnecting switch (DS), an earthing switch (ES), and a bus line (BUS) together with an insulation gas is disposed on a base B. An instrument transformer that detects electricity quantities of the main circuit components is disposed in the aforesaid tank TA. In the vicinity of signal extracting portions thereof, the sensor units 2-1, 2-2 (portions corresponding to a voltage instrument transformer VT and a current instrument transformer CT in FIG. 4) that convert analog output signals to digital data are disposed.

Open/close information (ON/OFF information) on the switchgears such as the circuit breaker (CB), the disconnecting switch (DS), and the earthing switch (ES) and information on gas density, oil pressure, and so on are also converted to signals easy to be digitalized by different devices, namely, the component control devices 3-1 to 3-4.

Output terminals of these sensor units 2-1, 2-2 are connected to the digital data merging unit 13 in the digital protection and control device 1. This digital protection and control device 1 is accommodated in a process control box 7. Further, the digital protection and control device 1 is coupled to the station bus S-NET extending from the main control building.

In FIG. 4, the aforesaid process control box 7 is integrally provided on the base B on which the tank TA of the aforesaid GIS is mounted, but it may be directly attached to an external periphery portion of the tank TA. Thus, the process control box 7 can be installed on the base B of the GIS or on the tank TA. The process control box 7 may be installed in a place apart from the base B of the GIS, in other words, in a place adjacent to the substation main equipment and not in the conventional main control building as in the prior art. In any case, since the process control box 7 is not installed in the main control building, the main control building can be greatly reduced in size. Note that it is also possible to install the digital protection and control device in the main control building.

Incidentally, though the GIS is explained as an example of the substation main equipment, an electric transformer with taps or other electric power equipment may replace the GIS, as will be described later.

Here, supplementary explanation on each unit illustrated in FIG. 3 will be given.

the process bus communication unit 11

The process bus communication unit 11 interfaces the protection and control unit 12, the digital data merging unit 13, and the communication unit 14 for component control devices with the process bus P-NET. The in-premise transmission in substations is trending toward international standardization. When the in-premise transmission is standardized, a relaying unit is provided between each of the units of the digital protection and control device 1 and the process bus P-NET, the relaying unit performing conversion in a protocol and a format between the standardized in-premise transmission mode and a transmission mode used in the digital protection and control device 1. With this relaying unit, the digital protection and control device 1 in this embodiment can be connected to the standardized process bus P-NET so that transmission between devices of different makers is made possible (multivendor communication). Incidentally, where multivendor communication is not involved, the transmission may be relayed based on the original protocol without any protocol or format conversion.

Since the process bus communication unit 11 is introduced in the digital protection and control device 1 as a parallel bus, it is imparted a function of converting serial data to parallel data when the process bus P-NET is a serial bus such as LAN.

What is transmitted/received through the process bus P-NET are mainly the digital data of the AC electricity quantities that are extracted from other bays (the substation main equipments (including the power transmission lines))

and used for the protection of the bus line and the voltage transformer, and trip signals outputted to the other bays.

the protection and control unit 12

The protection and control unit 12 discriminates a fault in protection zones through a protective relay arithmetic operation based on time-series digital data of the AC electricity quantities of the main circuits of the substation main equipment, and outputs a trip command (control command) to the corresponding circuit breaker or the like when detecting a fault. Note that the time-series digital data is taken into the protection and control unit 12 from the digital data merging unit 13.

Further, the protection and control unit 12 relay-processes a component selection and control command sent from a higher-order system and outputs this selection and control command to the circuit breaker or the disconnecting switch. This control command is transmitted to the corresponding device among the component control devices 3-1 to 3-n through a communication path via the communication unit 14 for component control devices.

Further, the protection and control unit 12 takes in information on component status events from the component control devices 3-1 to 3-n as component monitor data via the communication unit 14 for component control devices and transmits this data to the higher-order system when necessary. The component status event, which is also called 'component status change', means an event such as the oil pressure or gas pressure of the substation main equipment, open/close of the circuit breaker or the like. Information on time corresponding to the status change is appended to the component monitor data when necessary. The station bus S-NET separated from the process bus P-NET in terms of data transmission is usually used for the transmission to/from the higher-order system.

the digital data merging unit 13

The digital data merging unit 13 takes in the digital data of the AC electricity quantities from the sensor units 2-1 to 2-n using a transmission medium. As the transmission medium, for example, full-duplex communication or half-duplex communication in a point-to-point serial transmission path is usable. When the sensor units 2 are installed near the substation main equipment, optical communication is preferably used for the transmission medium. When an electric cable or the like is used as the transmission medium, it is preferable to apply Manchester transmission or the like to improve noise proof.

The data on the electricity quantities are digital signals of current and voltage and are transmitted to the protection and control unit 12, being classified by each object of protection and control. Here, the case when an analog filter circuit for protection and control is installed in each of the sensor units 2 will be explained. In this case, the electricity quantity data used for control (the electricity quantities that have passed through a filter for control) and the electricity quantity data used for the protective relay arithmetic operation (the electricity quantities that have passed through a filter for protection) are extracted from the digital data of the electricity quantities received at every data sampling, and the former data and the latter data are classified to the electricity quantities for control and the electricity quantities for protection, respectively.

As will be described later, when the protection and control unit 12 is divided into a protection unit 121 and a control unit 122, the data grouped for protection is transmitted to the protection unit 121 and the data grouped for control is transmitted to the control unit 122. The electricity quantity data from the plural sensor units 2 can be classified by each object of protection and control. Incidentally, the data for the plural objects of protection and control may be grouped to one unit.

Further, the digital signal of current and voltage may be subjected to a pre-process before being sent to the protection and control unit 12 such as sensitivity correction or phase correction process. Incidentally, time information corresponding to the electricity quantity may be appended to the digital signal in the digital data merging unit 13.

the communication unit 14 for component control devices

The communication unit 14 for component control devices relays data transmitted to/from the component control devices 3-1 to 3-n from/to the protection and control unit 12 and devices on the process bus P-NET. The communication unit 14 for component control devices is connected to the process bus P-NET via the process communication unit 11. The data transmitted from the protection and control unit 12 to the component control devices 3-1 to 3-n includes, for example, a control command (an open/close command to the switchgear according to fault detection and selection-and-control, and so on) and a trip signal from the parent station via the process bus P-NET. The data transmitted in a reverse direction includes, for example, component monitor data from the component control devices 3-1 to 3-n.

The synchronous control switching, interlocking control, and so on of the components and the time information corresponding to the change in the component status may be appended by the communication unit 14 for component control devices.

The component control devices 3-1 to 3-n and the communication unit 14 for component control devices are connected by a transmission medium. For the transmission medium, for example, a full-duplex communication mode or a half-duplex communication mode by means of a point-to-point serial transmission path is usable. When the sensor units 2 are installed near the substation main equipment, an optical communication mode is preferably used for the transmission medium. When an electric cable or the like is used as the transmission medium, Manchester transmission or the like is preferably applied to improve noise proof.

the sensor units 2

The sensor units 2 are preferably installed near a current detecting unit or a voltage detecting unit in light of noise proof performance. This is especially effective when the sensor units are connected to the current detecting unit or the voltage detecting unit whose secondary output is small.

As the current detecting unit, for example, a Rogowski coil, an iron core transformer, or an optical conversion type current sensor utilizing a Faraday effect is usable. As the voltage detecting unit, a metering voltage transformer of a capacitance-dividing type or a wire-wound type, an optical conversion type electric field sensor unitizing a Pockels effect, or the like is usable.

In each of the sensor units, a predetermined analog filter removes a harmonic component from the analog data, which is inputted from the current detecting unit or the voltage detecting unit, of the AC electricity quantity of the main circuit of the substation main equipment. Thereafter, the analog data is A/D converted and transmitted to the digital data merging unit 13 via the transmission medium at a predetermined cycle. Incidentally, the purpose of the removal of the harmonic component is to remove frequency components unnecessary for protection and control and to remove an alias error of the A/D converted data.

the component control devices 3

Each of the component control devices 3 takes in pallet contact information on the switchgear or the like (for example, in the case of the circuit breaker, an open/close status and contact information on a hydraulic switch, a gas density switch, and the like) and an analog output of a monitoring sensor, and transmits them to the communication unit 14 for component control devices as component monitor data.

Each of the component control devices decodes the control signal received through the transmission medium via the communication unit 14 for component control devices and outputs the decoded control signal as a control signal to a drive section for switchgears. To take the circuit breaker as an example, the control signal includes a driving signal to a trip coil and a closing coil, and a driving signal to a motor of a hydraulic pump.

the parallel bus P-BUS

As shown in FIG. 2, serial transmission based mainly on LAN is on the mainstream in transmission systems in substations. This is because multivendor communication is easily realized in a general-purpose LAN such as Ethernet LAN which is the standard in the industry and is suitable for international standardization, the system construction thereof costs low, and the degree of freedom in addition and modification is high (when hardware and application are also standardized).

However, coupling all of the process bus communication unit 11, the protection and control unit 12, the digital data merging unit 13, and the communication unit 14 for component control devices to one another by a serial medium such as LAN involves a risk of impairing realtime performance of transmission and resulting in transmission quality higher than required specifications to increase system cost. Protocols (for example, TCP/IP and UDP) applied to LAN incur a large overhead. To be more specific, hierarchy arrangement on the protocol is capsulated in a transmission frame and constituted as a flag, which results in a large volume of control data and a large load to an application.

In LAN and the like, a transmission method superior in noise proof such as a differential signal or the Manchester transmission is used, assuming a transmission distance of a certain length or more, and a measure for noise proof such as insulation by a pulse transformer at input/output is taken. The employment of LAN in the case when all the functions could be accommodated in adjacent devices or one device causes the overhead for protocol processing and increases the size of the device due to the measure for the noise proof, and so on, thereby turning out to be a factor of cost increase.

Therefore, the transmission in this embodiment employs the parallel bus between the units not requiring the use of the serial medium such as LAN without using any special protocol. This can increase the speed of data transmission to improve realtime performance required for protection and control.

(Operation of First Embodiment)

In the first embodiment, the bus transmission among all or parts of the units on the parallel bus P-BUS is controlled based on the multimaster transmission mode.

Figure 5:
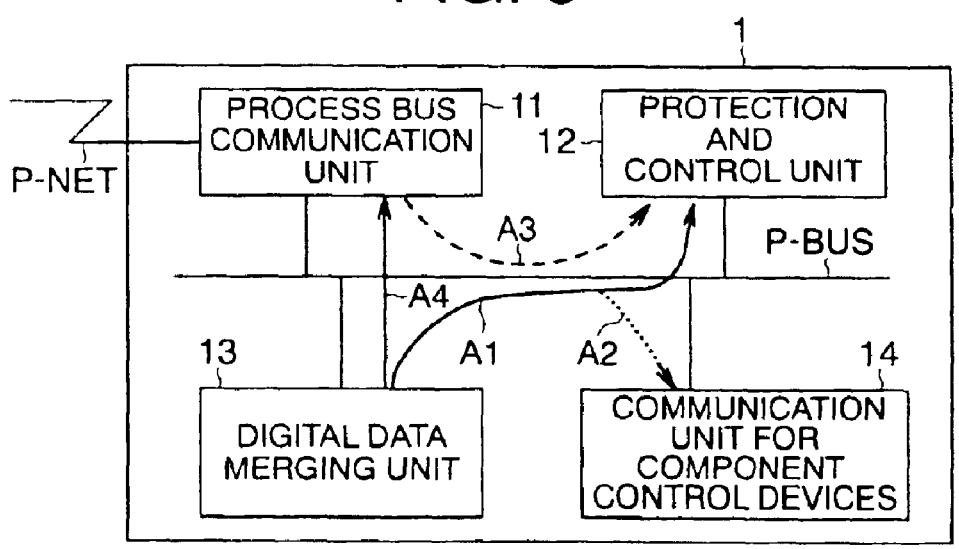
FIG. 5 is a schematic view showing a first concrete example of a multimaster transmission mode.

Conceptual diagrams of the multimaster transmission mode are shown in FIG. 5 and FIG. 6.

The transmission directions (A1 to A4, B1, and B2) in FIG. 5 and FIG. 6 show the master-slave relationships.

the transmission direction A1 (master side: the digital data merging unit 13, slave side: the protection and control unit 12)

The digital data merging unit 13 correction-processes the digital data of instantaneous values of the electricity quantities inputted from the sensor units 2 (data obtained by digitalizing the AC electricity quantities of the main circuits of the substation main equipment) when necessary, and transmits the digital data to the protection and control unit 12, after appending the time data to the digital data. This correction process includes, for example, correction of time discrepancy in switching by a multiplexer at the time of A/D sampling on the sensor unit side and correction of a temperature fluctuation amount including the current instrument transformer.

It is necessary to control the protection and to give priority to the data of the instantaneous values in reception by the protection and control unit 12 irrespective of the operational status thereof since this data has a realtime nature. Therefore, in the transmission of this data of the instantaneous values, it is appropriate that the digital data merging unit 13 is defined as the master and the protection and control unit 12 is defined as the slave.

the transmission direction A2 (master side: the digital data merging unit 13, slave side: the communication unit 14 for component control devices)

When the communication unit 14 for component control devices is made to control synchronous control switching on the substation main equipment side, the data on the AC electricity quantities of the main circuits are necessary. In order to ensure realtime performance of this data, the data from the digital data merging unit 13 is given priority in reception by the communication unit 14 for component control devices. Therefore, in this transmission of the data of the instantaneous values, it is appropriate that the digital data merging unit 13 is defined as the master and the communication unit 14 for component control devices is defined as the slave.

the transmission direction A4 (master side: the digital data merging unit 13, slave side; the process bus communication unit 11)

In the case of bus line protection, it is necessary in the example shown in FIG. 3 to transmit the electricity quantity digital data of the power transmission line X13 to a bus line protection device in the substation via the process bus P-NET. Also in this case, the data transmitted from the digital data merging unit 13 is given priority in reception by the process bus communication unit 11 since realtime performance is considered important. Therefore, in this data transmission, it is appropriate that the digital data merging unit 13 is defined as the master and the process bus communication unit 11 is defined as the slave.

the transmission direction A3 (master side: the process bus communication unit 11, slave side: the protection and control unit 12)

In the case of voltage transformer protection, judgment on fault or not is made after a differential operation of the respective AC electricity quantities of a primary side and a secondary side of the voltage transformer is executed. In this case, the digital protection and control device 1 installed on the primary side of the voltage transformer takes in the electricity quantity on the secondary side of the voltage transformer via the process bus P-NET. At this time, in FIG. 5, the electricity quantity digital data received in the process bus communication unit 11 is given priority in reception by the protection and control unit 12 in light of ensuring the realtime performance. Therefore, it is appropriate in this data transmission that the process bus communication unit 11 is defined as the master and the protection and control unit 12 is defined as the slave.

the transmission direction B1 (master side: the protection and control unit 12, slave side: the communication unit 14 for component control devices).

The protection and control unit 12 executes the protective relay arithmetic operation to judge a fault occurrence in the substation main equipment (including the bus line and the power transmission line). Further, the protection and control unit 12 relays, as a control function, the open/close command (control signal) for the switchgear, which is transmitted from the substation controlling-and-monitoring equipment of a higher order system. This means that it transmits the open/close command (control signal) for the switchgear to the component control devices 3-1 to 3-n via the communication unit 14 for component control devices. This control signal, which is a highest priority command in light of protection and control against the fault, is given priority in reception by the communication unit 14 for component control devices. Therefore, in the transmission of this control signal (command), it is appropriate that the protection and control unit 12 is defined as the master and the communication unit 14 for component control devices is defined as the slave.

the transmission direction B2 (master side: the protection and control unit 12, slave side: the process bus communication unit 11)

For the purpose of protecting the bus line (parent station), a trip signal (trip command) is transmitted to the component control device of each main-circuit via the process bus P-NET. The trip signal, which is the highest priority signal in view of protection, is preferably given priority in reception by the process bus communication unit 11 from the protection and control unit 12 to be transmitted onto the process bas P-NET. Therefore, in the transmission of this trip signal, it is appropriate that the protection and control unit 12 is defined as the master and the process bus communication unit 11 is defined as the salve.

As is described in the foregoing examples, the unit to be a master is not fixed and the unit to be an optimum master varies depending on the transmission data. The realtime performance is important for performance in the protective relay process and control (especially, transmission time performance in the case of remote control), and the multimaster mode is preferable.

In this multimaster mode, it is not generally permitted that two masters exist at the same instant among a plurality of units connected to the same bus. This is because data collision occurs when the two masters accesses the same bus.

In this case, a bus arbitration function is necessary, and it is sufficient that the bus arbitration function is imparted to one unit selected from the units connected to the same bus. Incidentally, when cost allows, a unit assigned only the bus arbitration function may be connected to the same bus.

When one of the units connected to the same bus is defined as the master, this unit accesses the bus as the master after demanding the bus control right to one of the units having the bus arbitration function to acquire the bus control right. Information on this demand and permission is generally exchanged using an exclusive signal line on the same bus. However, when a serial bus is employed as the bus, the multimaster transmission is realized without using the bus arbitration function of demand and permission of the bus control right by making use of the bus collision, in other words, retransmitting data after a certain length of waiting time that is started triggered by detection of the collision.

The parallel bus P-BUS in this embodiment is not in the serial transmission mode but in the parallel bus transmission mode and therefore, can transmit large bit data at the same time. This can realize high-speed transmission, which is highly effective in ensuring the realtime performance. In the aforesaid master-slave relationships, data is transmitted through the common parallel bus P-BUS, but the parallel bus may be divided into plural buses, for example, the combination of an exclusive bus coupling two units and a common bus coupling three units.

Data not requiring high-speed transmission (for example, monitor data from the component control devices at low cycle, and the like) may be transmitted/received through a serial medium in the digital protection and control device 1.

Here, supplementary explanation will be given on the protection and control unit 12. An example of the inner configuration of the protection and control unit 12 is shown in FIG. 7.

In FIG. 7, the protection and control unit 12 is constituted of the protection unit (PU) 121 and the control unit (CU) 122. Note that a power supply and so on are omitted in the drawing. The protection unit 121 and the control unit 122 are independently structured from each other, each connected to the parallel bus P-BUS and the station bus S-NET in the digital protection and control device 1.

This means that the protection unit 121 and the control unit 122 have separate functions. Each of these units has an independent digital arithmetic processor, program storage section, input/output interface section, and so on, which results in reliability enhancement. If a common digital arithmetic processor and so on are used for the protection unit 121 and the control unit 122, it involves a risk that a protection function and a control function may be both impaired together when a fault occurs in the common portion. This embodiment can avoid such a situation.

In this case, the printed board can be separated to one for the protection unit 121 and one for the control unit 122. At this time, the inner structure of the protection unit 121 or the control unit 122 may be divided using a plurality of boards for respective functions. It is also possible to use the same printed board and separate the protection unit 121 and the control unit 121 as each circuits. Alternatively, it is also possible to separate the protection unit 121 and the control unit 122 on an accommodation rack level and to connect the respective racks to each other via a parallel bus P-BUS or a serial transmission bus.

Independent structure of the protection unit 121 and the control unit 122 results in cost increase, though enhancing reliability, and therefore, it is necessary to balance between reliability and cost according to the class or scale of applied voltage. Cost-emphasized structure is realized by increasing the common portion.

Figure 8:
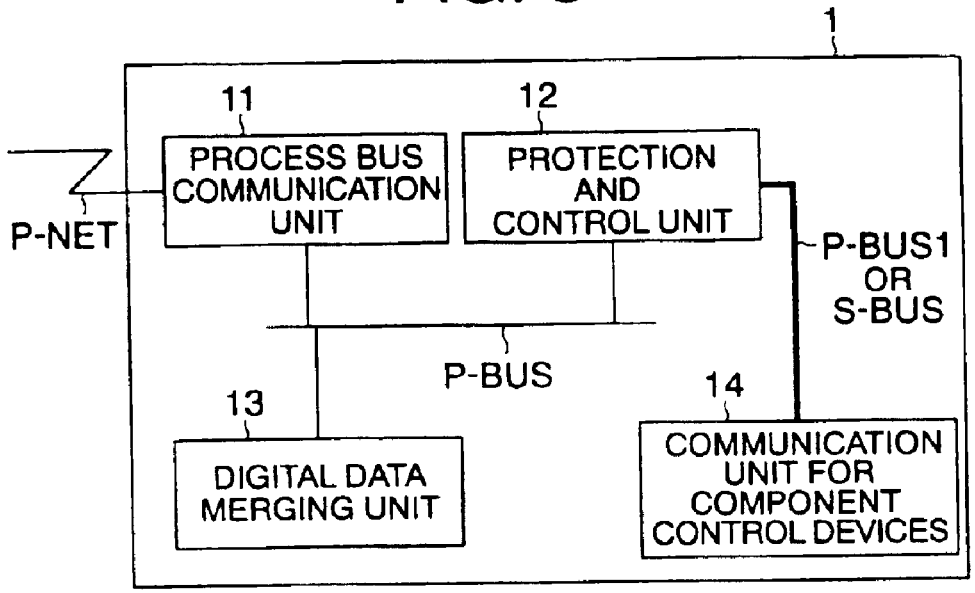
FIG. 8 is a block diagram showing a first modification example of the functional configuration of the first embodiment.
Figure 9:
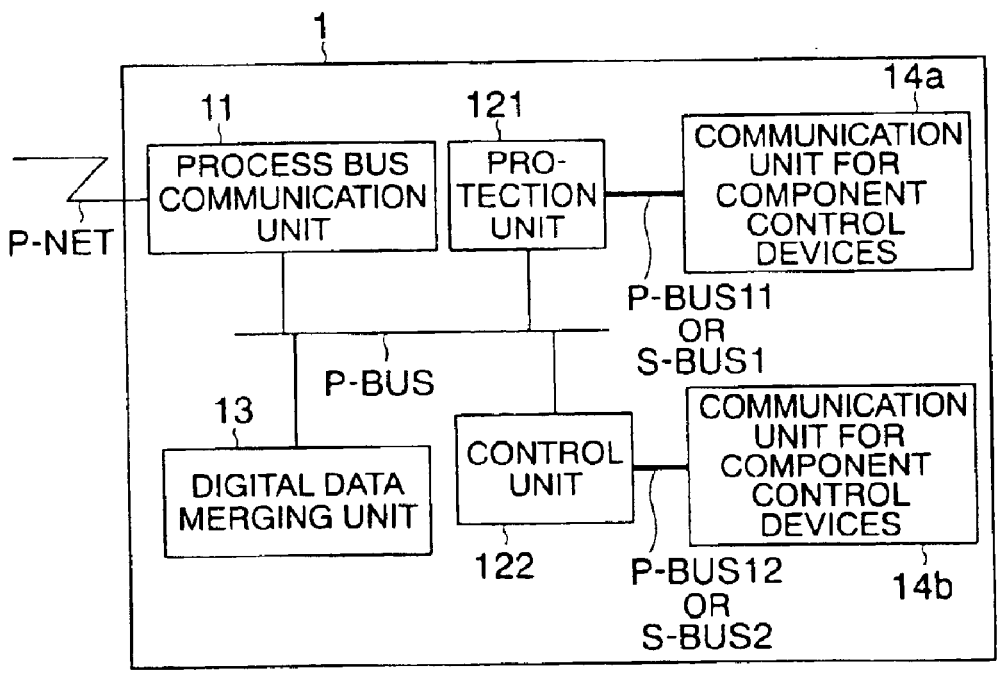
FIG. 9 is a block diagram showing a second modification example of the functional configuration of the first embodiment.

Examples different from the connection example inside the digital protection and control device 1 shown in FIG. 3 are shown in FIG. 8 and FIG. 9.

In FIG. 8, compared with the inner structure of the digital protection and control device 1 shown in FIG. 3, the communication unit 14 for component control devices is connected to the protection and control unit 12 not by the common parallel bus P-BUS, but by an exclusive parallel bus P-BUS1 or an exclusive serial bus S-BUS.

Here, the AC electricity quantity data of the main circuit is transmitted to the protection and control unit 12 from the digital data merging unit 13 via the parallel bus P-BUS, and the control command (the open/close command for the switchgear in accordance with fault detection and select command, and so on) to the component control devices 3-1 to 3-n is transmitted via the exclusive bus P-BUS1. This prevents the electricity quantity data from occupying the bus, thereby eliminating a waiting state in the transmission of the control command, which makes it possible to improve time performance (performance of response to a fault of the protective relay, time performance of selection-and-control, and so on).

In FIG. 9, compared with the configuration shown in FIG. 8, the protection unit 121 and the control unit 122 are separated in terms of information transmission in order to improve independency of protection and control. To be more specific, the protection unit 121 is connected to a communication unit 14a for component control devices for exclusive use in protection, by an exclusive parallel bus P-BUS11 or an exclusive serial bus S-BUS1. The control unit 122 is connected to a communication unit 14b for component control devices for exclusive use in control, by an exclusive parallel bus P-BUS12 or an exclusive serial bus S-BUS2. The route for outputting the control signal from the protection unit is separated from the route for outputting the control signal from the control unit, which can prevent such a situation that a defect or the like in a common portion causes output incapability both in the protection function and the control function.

The configuration shown in FIG. 8, though high in reliability compared with that shown in FIG. 3, requires two buses, which complicates the structure and application to some extent. The configuration shown in FIG. 9, though extremely high in reliability, requires three buses and has communication paths provided for protection and control on the component control device side, which increases the number of cables. Accordingly, the configuration shown in FIG. 9 increases hardware scale, which tends to result in a greater cost increase than that in the configuration shown in FIG. 3.

The selection from the configurations shown in FIG. 3, FIG. 8, and FIG. 9 is determined appropriately according to the applied voltage class of the substation equipment (generally, more importance is put on reliability than on cost for a higher voltage key system) and demand from users.

Figure 10:
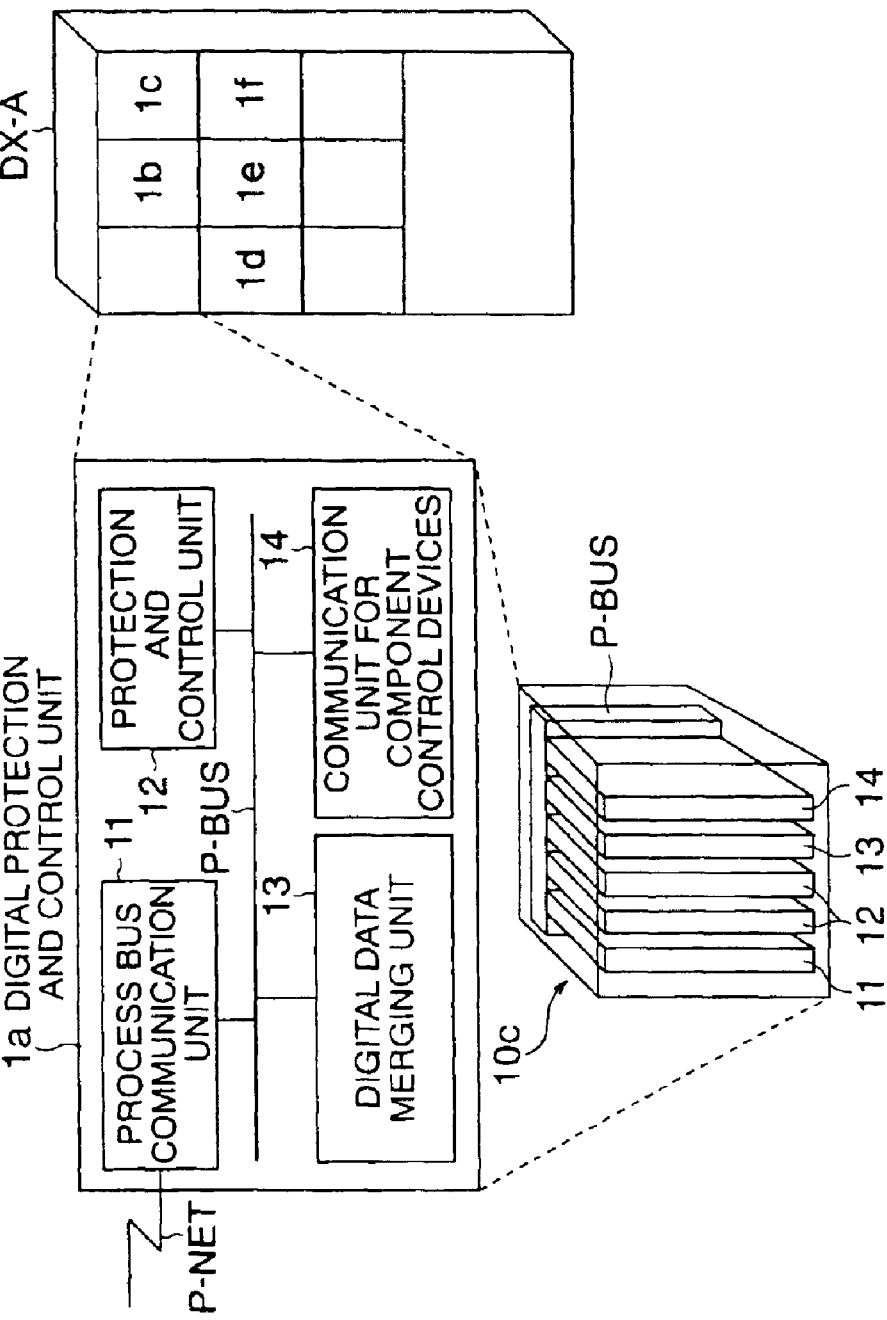
FIG. 10 is a schematic diagram showing a first configuration example of a digital protection and control device.
Figure 11:
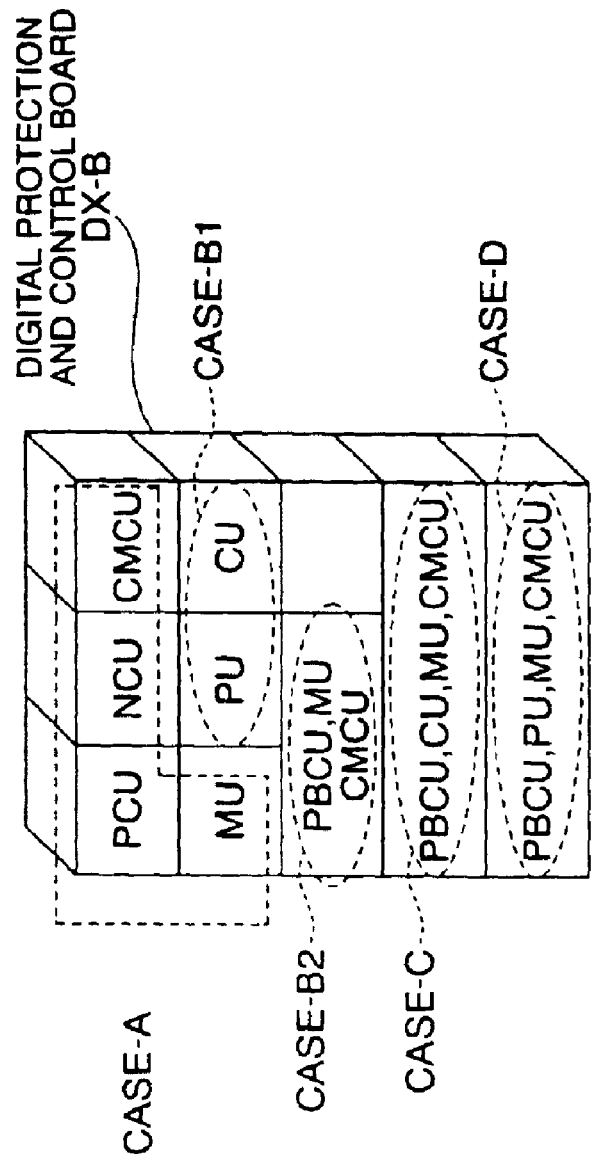
FIG. 11 is a schematic diagram showing a second configuration example of the digital protection and control device.

Next, examples of the device configuration of the digital protection and control device are shown in FIG. 10 and FIG. 11.

FIG. 10 shows that all of the process bus communication unit 11, the protection and control unit 12, the digital data merging unit 13, and the communication unit 14 for component control devices are accommodated in one accommodation rack 10C. A printed board having a function of the process bus communication unit 11, a printed board having a function of the protection and control unit 12, a printed board having a function of the digital data merging unit 13, a printed board having a function of the communication unit 14 for component control devices, and the parallel bus P-BUS constituted as a backboard that bus-connects these printed boards are accommodated in the accommodation rack 10C. Incidentally, a power supply is omitted in the drawing.

It should be noted that the number of the printed boards accommodated in the accommodation rack 10C is not limited to the number shown in FIG. 10, and each of these units 11 to 14 may be constituted by a plurality of printed boards. Further, a plurality of units having the same function may be accommodated in the accommodation rack 10C. For example, a plurality of printed boards grouped together according to an intended use, for example, a printed board for a protection and control unit for distance relay, a printed board for a protection and control unit for PCM, and so on can be accommodated in the accommodation rack 10C. In addition, instead of using separate boards for the respective units, for example, a plurality of circuits having the functions of the respective units may be accommodated on one printed board. In this case, the parallel bus P-BUS is provided on the same board. The physical structure and the number of the boards are not limited as long as the functions of the digital protection and control device 1 described in FIG. 3 are realizable.

Such a structure may also be employed that all or a part of the units are accommodated in one custom module or LSI and a parallel bus constituted of an in-LSI wiring pattern or the like is disposed in this custom module or LSI.

With the present electronic circuit and high-density package technology, it is possible to accommodate digital protection and control functions in one small accommodation rack and to accommodate this accommodation rack in the process control box 7 of the substation main equipment shown in FIG. 4.

Further, it is also possible to install the digital protection and control functions as a protection and control panel on a chassis near the substation main equipment, in a control room of an annex, or the like, instead of incorporating it in the substation main equipment. In FIG. 10, digital protection and control devices 1a to 1f (no restriction on the number thereof) are accommodated in a digital protection and control panel DX-A. When the digital protection and control device 1 is not incorporated in the substation main equipment, it is possible to concentratedly accommodate the respective digital protection and control devices for protecting and controlling the substation main equipments of other bays in one digital protection and control panel DX-A.

In this case, transmission mediums connecting the digital protection and control panel DX-A to the component control devices 3-1 to 3-n and the sensor units 2-1 to 2-n installed in the substation main equipments of the respective bays are laid. As the transmission mediums, for example, serial transmission mediums are preferably used in order to reduce the number of cables. As the transmission mediums, optical or electric cables are usable. The transmission mediums are preferably optical cables in light of noises from the environment, but if permissible in view of the noise proof environment, electric cables can also be used.

In this embodiment, the digital protection and control device 1 can be installed apart from the substation main equipment, in a clean and not severe place in terms of environment proof performance (temperature, humidity, noise, and so on). As a result, quality and lifetime of the digital protection and control devices 1a to 1f that are digital devices can be improved.

The structure of incorporating the digital protection and control device 1 in the substation main equipment is employed, when permissible in view of the environment proof performance of the digital protection and control device 1. This is because total cost can be reduced owing to the incorporation in the main equipment since this structure can save the trouble of manufacturing a separate protection and control panel, conducting field installation experiments, and so on.

A modification example of the abovementioned structure of the protection and control panel is shown in FIG. 11. The units in the digital protection and control device 1 are accommodated in respective independent accommodation cases in the portion denoted by the reference symbol CASE-A in the drawing. In this structure, all or parts of the racks are also connected by a parallel bus P-BUS in the protection and control panel.

Here, it is also possible to divide the protection and control unit 12 into the protection unit 121 and the control unit 122, which are accommodated in independent racks respectively, as in the portion denoted by the reference symbol CASE-B1.

In the portion denoted by the reference symbol CASE-B2 in this drawing, the digital data merging unit 13, the communication unit 14 for component control devices, the process bus communication unit 11, the parallel bus P-BUS connecting these units to one another are accommodated in a single rack. Here, the CASE-B1 portion and the CASE-B2 portion are connected by a parallel bus or a serial bus in the protection and control panel outside the racks. As this serial bus, the process bus P-NET in the substation premises may be used in common, but it is more advantageous in terms of bus traffic load to separate this serial bus from the process bus P-NET in the substation premises or to constitute the serial bus by a different exclusive serial bus.

Alternatively, it is also possible to accommodate only the process bus communication unit 11 and the digital data merging unit 13 in the same rack and to accommodate the process bus communication unit 11, the protection and control unit 12, and the communication unit 14 for component control devices in a different rack, though this structure is not shown. In this case, these racks are connected to each other by the serial bus or the parallel bus on the protection and control panel. As a result, the racks both have the process bus communication unit 11. The first embodiment does not limit the physical number of the respective units, and therefore such a structure is also included in this embodiment.

(Characteristics of First Embodiment)

Time performance can be ensured through the use of the parallel bus P-BUS in the portions transmitting/receiving the protection and control data requiring realtime performance (for example, the portions transmitting/receiving the instantaneous value data of the AC electricity quantities of the main circuits of the substation main equipment, the transmission line for the open/close command to the circuit breaker and so on in accordance with the fault detection by the protective relay, and so on).

Here, if a certain unit among the units 11 to 14 is assigned an unbalancedly large volume of a data bus process (master process), the load of the bus process becomes large to disable the maintenance of the time performance as a whole, which causes a risk that a fault of this unit may impair data transmission/reception as the whole device. The multimaster-based transmission enables each unit to transmit/receive data independently so that the aforesaid problem is avoidable.

The functional configuration of this embodiment is realizable by various physical structures such as a protection and control panel as a large structure, a custom module as a small structure, or the like. Concrete examples thereof are as described above.

(Modification Example of First Embodiment)

FIG. 11 shows a modification example of the first embodiment.

In this drawing, the protection function (PU) and the control function (CU) are separated in CASE-D and CASE-C respectively, and they constitute a digital protection device and a digital control device respectively.

Here, the following shows to which components the reference symbols in the drawing correspond respectively.

PCU: the protection and control unit 12, PBCU: the process bus communication unit 11, CMCU: the communication unit 14 for component control devices, CU: the control unit 122, MU: the digital data merging unit 13, PU: the protection unit 121.

As shown in FIG. 11, the digital protection device has a configuration exclusively for protection in which all or a part of the process bus communication unit 11, the protection unit 121, the digital data merging unit 13, and the communication unit 14 for component control devices are connected by the parallel bus P-BUS. The digital control device has a configuration exclusively for control in which all or a part of the process bus communication unit 11, the control unit 122, the digital data merging unit 13, and the communication control unit 14 for component control devices are connected by the parallel bus P-BUS.

Base on this configuration, the multimaster mode that characterizes the first embodiment is applicable. Further, this configuration is also applicable to all the other embodiments which will be explained hereafter.

This modification example is characterized in that protection and control are independent from each other. The process bus P-NET is used for communication therebetween. The use of separate devices for protection and control enables easy separation (division) of power supplies to realize high reliability. This structure is suitable for an ultrahigh voltage substation system since more importance is put on reliability than on cost therein.

When the protection function is constituted of a main detecting relay and a fault detecting relay (failsafe relay), the device may be separated into a protection device for main detecting relay and a protection device for fault detecting relay. This can further enhance reliability. Also in this case, the functional configuration in each of the devices can be made similar to that of CASE-D.

(Second Embodiment)

A second embodiment will be explained with reference to FIG. 12 and FIG. 13. Here, only the digital protection and control device 1 is shown. The component control devices 3-1 to 3-*n* and the sensor units 2-1 to 2-*n* are the same as those in the first embodiment, and therefore they are omitted in the drawing.

In the second embodiment, data transmission between the units among the process bus communication unit 11, the protection and control unit 12, the digital data merging unit 13, and the communication unit 14 for component control devices is in a single master mode.

In the single master mode, the unit having the bus control right is fixed. In other words, it is a transmission mode in which the master-slave relationship is fixed. For example, one of the process bus communication unit 11, the digital data merging unit 13, and the communication unit 14 for component control devices is defined as a master and all the others are defined as slaves.

Data exchange among the aforesaid units is controlled by the master and data transmitted between the slaves is also once taken into the master, and thereafter is transmitted to the destination slave.

The single master mode is applicable as long as the bus process load is not problematic in terms of the processing power of the unit defined as the master. The adoption of the single master mode stabilizes time coordination. In the single master mode, the unit defined as the master is fixed, which simplifies data bus control among the units and eliminates the necessity of bus arbitration. Further, data transmission management is intensively taken on by the unit defined as the master, thereby simplifying the application in the data transmitting/receiving portions. This simplification is effective for quality improvement of the device. Moreover, a defective mode of the bus is simplified, which also facilitates monitoring of the bus.

In this mode, a defect in the master unit tends to be significantly influential since it disables data transmission even between the sound units. In addition, the master unit intervenes in the data exchange between the slaves, and this intervention tends to affect the realtime performance of data transfer.

The demand for the realtime performance can be satisfied by the speed increase or the like of the parallel bus P-BUS.

There is such a safe side standpoint that more importance is to be put on the prevention of malfunction at the time of the relay operation and control operation than on the continuation of operation at the time of protection and control. From this standpoint, a defect in the master unit is treated as a defect in the whole device, and therefore, the idea of fixing the master in the second embodiment is not problematic at all.

On the other hand, there is another standpoint that more importance is to be put on the protection of the facility of the substation main equipment. From this standpoint, even when one of the constituent elements has a defect, the protection or control function is continued by other sound constituent elements (if operable).

It is difficult to determine which of these standpoints is better since it depends on the way of thinking on the power company side and the user side in general industry. Note that the first embodiment is adaptable to both standpoints.

Next, concrete examples of the single master mode will be explained with reference to FIG. 12 and FIG. 13.

Figure 12:
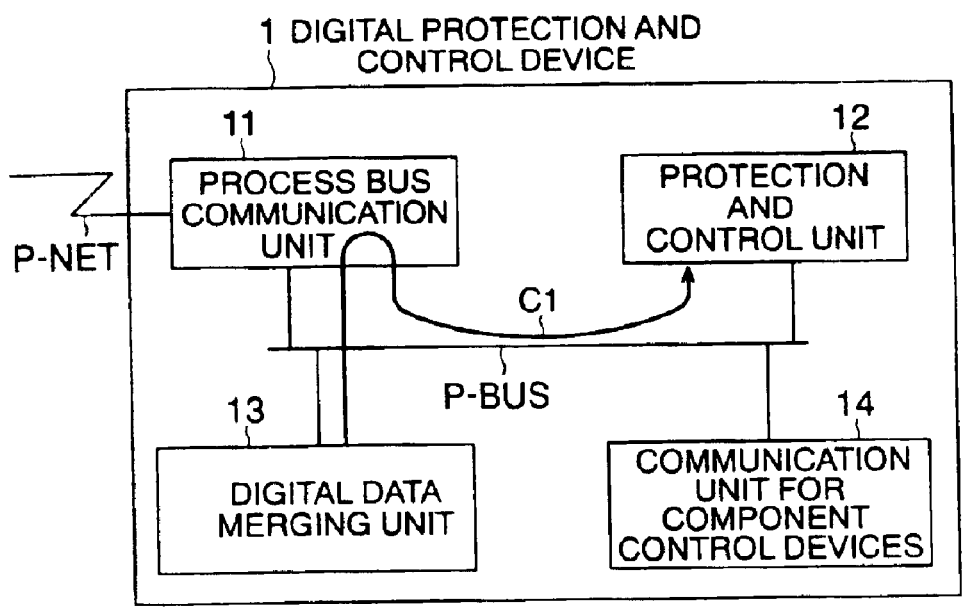
FIG. 12 is a schematic diagram showing a first concrete example of a single master transmission mode in a second embodiment.
Figure 13:
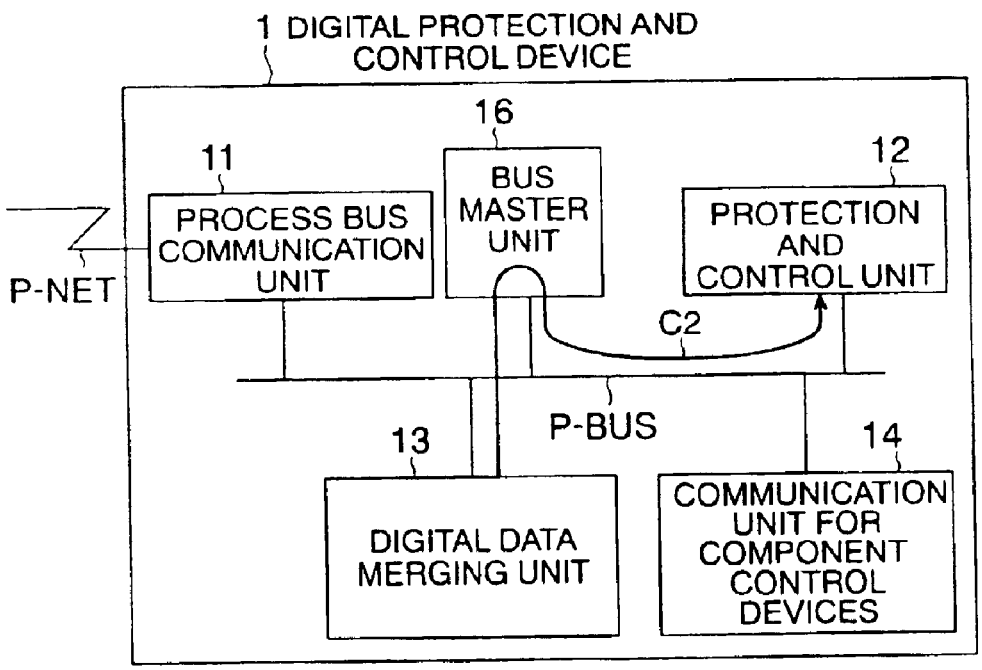
FIG. 13 is a schematic diagram showing a second concrete example of the single master transmission mode in the second embodiment.

FIG. 12 and FIG. 13 show the master-slave relationships. In FIG. 12, the process bus communication unit 11 is defined as the master and all of the protection and control unit 12, the digital data merging unit 13, and the communication unit 14 for component control devices are defined as the slaves.

The process bus communication unit 11 is a unit that interconnects the process bus P-NET and the parallel bus P-BUS in the digital protection and control device 1. At this time, it is necessary to control data relay so as to prevent such a situation that transmission data to/from the process bus P-NET is mixed with bus data in the parallel bus P-BUS, which are transmitted among the protection and control unit 12, the digital data merging unit 13, and the communication unit 14 for component control devices, thereby deteriorating bus traffic in the digital protection and control device 1. The process bus communication unit 11, which is a key component in bus control inside the digital protection and control device 1, is preferably fixed as the master in the single master mode.

A bus line protective relay is realizable in such a manner that the digital protection and control device 1 serves as a parent station for bus line protection, and the AC electricity quantities (digital data) of the main circuits of the substation main equipment are inputted thereto from other digital protection and control devices separately provided for respective main-circuits. In this case, the AC electricity quantities (digital data) of the main circuits are mainly taken in via the process bus P-NET. Therefore, data flow control is made easier when the process bus communication unit 11 in the digital protection and control device 1 controls not only an external bus but also an internal bus thereof.

In a digital protective relay for voltage transformer protection, when fault judgment is made by a differential operation of the electricity quantities of a primary side and a secondary side or the like of a voltage transformer, the electricity quantity on the secondary side is transmitted to the digital protection and control device 1 disposed on the primary side via the process bus P-NET.

In this case, the protection and control unit 12 requires both of data on the secondary side of the voltage transformer and data on the primary side of the voltage transformer, which is in the digital data merging unit 13. The process bus communication unit 11 defined as the master controls the protection and control unit 12 defined as the slave to give priority to the secondary-side data and the primary-side data in reception.

Note that the transmission direction C1 shown in FIG. 12 indicates that the primary-side data is taken out from the digital data merging unit 13 to be transmitted to the protection and control unit 12.

In FIG. 13, a bus master unit 16 is coupled to the same parallel bus P-BUS as a second unit besides the process bus communication unit 11, the protection and control unit 12, the digital data merging unit 13, and the communication unit 14 for component control devices.

When the process bus communication unit 11 is defined as the bus master as shown in FIG. 12, the bus process load thereon becomes heavy, which may possibly affect arithmetic process load such as protocol conversion processed in the process bus communication unit 11. This problem can be solved by applying a high-speed digital arithmetic processor to the process bus communication unit 11. However, when the high-speed arithmetic process is not required, the bus master unit 16 is preferably provided as the second unit. This equalizes the process load in the digital protection and control device 1.

The transmission direction C2 shown in FIG. 13 indicates that the data (digital data) of the AC electricity quantities of the main circuits of the substation main equipment, which are transmitted from the digital data merging unit 13, is taken in by the bus master unit 16 to be transmitted to the protection and control unit 12 defined as the slave.

In the foregoing, the concrete examples are discussed with reference to FIG. 12 and FIG. 13. The following factors are taken into consideration in determining the master unit. The factors to be considered are the mode of the protective relay of the digital protection and control device 1 (bus line protection, voltage transformer protection, power transmission line protection [distance relay, PCM relay, and so on]), data transmission/reception relationship in the system configuration (whether each main-circuit is to be controlled independently or a plurality of main-circuits are collectively controlled, or the like), data transmission/reception relationship in the device, hardware performance of each unit applied, easiness of realizing defect monitoring in the device, and so on.

It should be noted that this embodiment is not limited to the single master structures shown in FIG. 12 and FIG. 13.

(Characteristics of Second Embodiment)

This embodiment is applicable unless bus process load in the digital protection and control device is problematic in light of the processing power of the master unit. Time performance and time coordination are stabilized. Further, the centralization of bus control eliminates the necessity of the bus arbitration function, thereby enabling hardware simplification. Moreover, a defective mode of the bus is simplified to facilitate bus monitoring.

(Third Embodiment)

Figure 14:
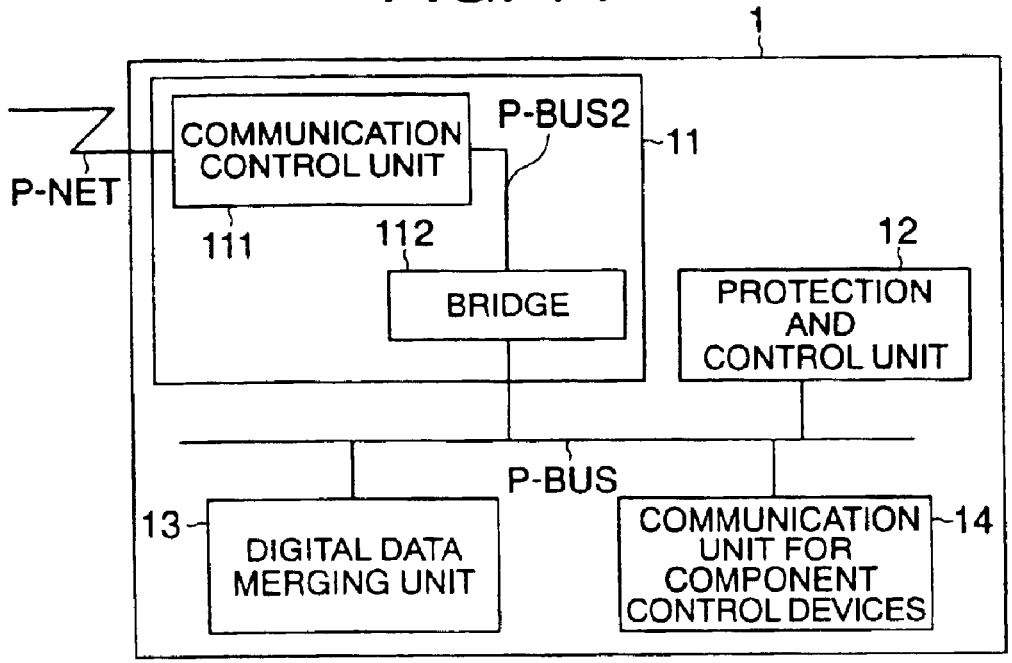
FIG. 14 is a block diagram showing an example of the functional configuration of a third embodiment.

A third embodiment will be explained with reference to FIG. 14. Here, only the digital protection and control device 1 is shown. The component control devices 3-1 to 3-n and the sensor units 2-1 to 2-n are the same as those in the first embodiment, and therefore, they are omitted in the drawing.

In this drawing, in the first and second embodiments, the process bus communication unit 11, the protection and control unit 12, the digital data merging unit 13, and the communication unit 14 for component control devices are connected by the common parallel bus P-BUS.

The third embodiment is characterized in the structure of a function of processing transmission data in the process bus communication unit 11. In this drawing, only functions necessary for explanation are shown. The transmission data in the process bus communication unit 11 is mainly processed in a bridge 112 connecting a communication control unit 111 and a parallel bus P-BUS2. This bridge 112 is also connected to the parallel bus P-BUS in the digital protection and control device 1.

Here, the process data include AC electricity quantities of main circuits of the substation main equipment X1, a control signal, monitor information, and so on, and the digital protection and control device 1 only requires the process data in the protection zone and the control/monitor zone. Therefore, providing the bridge 112 in the process bus communication unit 11 can prevent unnecessary data from flowing to the transmission bus (parallel bus P-BUS) connecting the protection and control unit 12, the digital data merging unit 13, and the communication unit 14 for component control devices to one another so that deterioration of bus traffic in the device can be prevented.

Further, comparing with such a structure that an external router or the like bridges the data transmission on the process bus P-NET to take in only the process data on the protection zone and the control/monitor zone (data flowing on the process bus) necessary for the digital protection and control device 1, an external apparatus such as the aforesaid router is unnecessary. This results in total cost reduction of the system construction.

The parallel bus P-BUS and the parallel bus P-BUS2 are in the same transmission mode. This means that, for example, when a PCI bus is applied as the parallel bus P-BUS, the PCI bus is applied also as the parallel bus P-BUS2. Since the buses in the same mode are used both as the parallel bus P-BUS and the parallel bus P-BUS2, bridge control by the bridge 112 is easy and complicated arbitration of transmission accesses or the like is not required. This can simplify hardware.

Basically, transmission/reception data may be relayed as it is, but a function of selecting data to be relayed may be provided. With this function, it is avoidable that data of one of the parallel bus P-BUS and the parallel bus P-BUS2 is transmitted to the other parallel bus not requiring the data to worsen the traffic. Note that this parallel bus P-BUS2 is a bus through which the process data is transmitted/received.

In the configuration explained in FIG. 2, since the process bus P-NET (denoted by the reference symbol Z29 in FIG. 2) crosses different main-circuits in the substation, an apparatus for adjusting bus traffic (for example, a router, HUB, or the like) is necessary in the external part thereof. The router or the like is provided for the purpose of separating the traffic in the process bus P-NET to ensure the realtime performance of the bus transmission. Without any router or the like, the realtime performance of the transmission may sometimes be impaired.

This situation will be explained. In the bus line protection and the voltage transformer protection for the purpose of protecting the substation main equipment (including the power transmission line), AC electricity quantities of the main circuits of the substation main equipments of other bays (or other main-circuits) are necessary. However, in distance relay or overcurrent protection, earth fault protection, and the like for the purpose of power transmission line protection which does not require the electricity quantities of the other bays and only requires the protection of an own end portion, only the AC electricity quantity flowing through the power transmission line of the own end portion is necessary in the protective relay arithmetic operation. Thus, in a substation system constituted of a plurality of main-circuits, the process bus transmission of the electricity quantity information from the other bays is sometimes necessary and sometime unnecessary depending on the protection scheme thereof. If a large volume of electricity quantity data used for the voltage transformer protection or the bus protection flows to the process bus P-NET in the own bay when the electricity quantity information of the other bays is not required, traffic is extremely worsened to impair the realtime performance of the transmission.

From the reason stated above, a router or the like is sometimes provided in the external part, but since this embodiment includes a simple bridge function, the external router or the like is not required. However, the provision or non-provision of the router or the like does not restrict this embodiment.

Note that this embodiment is applicable to all the structures exemplified in the first embodiment and the second embodiment.

(Characteristics of Third Embodiment)

Since the process data transmission/reception bus (parallel bus P-BUS2) in the process bus communication unit 11 works as a common bus of the parallel bus P-BUS in the digital protection control device 1, the necessity of a special circuit for converting transmission timing and the like is eliminated and a bridge function can be realized with simple hardware. In addition, compared with the case when the data transmission on the process bus is bridged by the external router or the like, total cost for system construction can be reduced.

(Fourth Embodiment)

Figure 15:
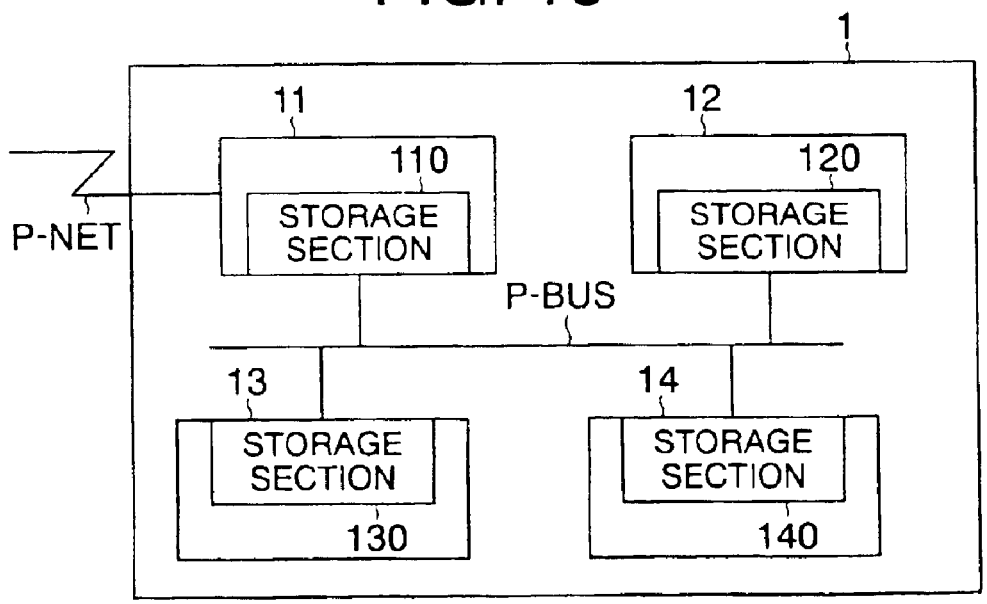
FIG. 15 is a block diagram showing an example of the functional configuration of a fourth embodiment.

A fourth embodiment will be explained with reference to FIG. 15. Here, only the digital protection and control device 1 is shown. The connection state to the component control devices 3-1 to 3-n and the sensor units 2-1 to 2-n is the same as that in the first embodiment, and therefore, they are omitted in the drawing.

This drawing shows the configuration that, in the first embodiment and the second embodiment, the digital data merging unit 13, the protection and control unit 12, the communication unit 14 for component control devices, and the process bus communication unit 11 are connected by the common parallel bus P-BUS. This embodiment is applicable both to the multimaster mode in the first embodiment and the single master mode in the second embodiment.

Each of the digital data merging unit 13, the protection and control unit 12, the communication unit 14 for component control devices, and the process bus communication unit 11 has a storage section that stores therein data transmitted on the parallel bus P-BUS. A storage section 110 in the process bus communication unit 11, a storage section 120 in the protection and control unit 12, a storage section 130 in the digital data merging section 13, and a storage section 140 in the communication unit 14 for component control device correspond to this storage section.

These storage sections 110, 120, 130, 140 are allocated on a storage space of the parallel bus P-BUS in advance, and according to this allocation, data exchange among the protection and control unit 12, the digital data merging unit 13, and the communication unit 14 for component control devices is so controlled that data is delivered to the storage sections.

(Operation in Fourth Embodiment)

As the storage sections in this embodiment, semiconductor memories are usable. The memories are not limited to the specific kind. Memory control circuits only differ depending on applied memories. For example, dual-port memories or the like effective for data transfer between different buses are adoptable as the memories. In this case, the parallel bus P-BUS and a main bus of a circuit in each unit can be separated so that a special data transmission/reception circuit or an arbitration circuit is not required, which makes it easy to ensure the functional quality.

This embodiment is characterized in that the data exchange among the units in the digital protection and control device 1 is allocated in the storage space on the parallel bus P-BUS in advance. An address bus on the parallel bus determines an address space allotted on the bus. Each of the address ranges of the storage sections 110, 120, 130, 140 of the respective units is allocated in the address space by a decode circuit of the hardware.

This decode circuit is provided in a control circuit of each of the storage sections, and it judges whether or not an access to the storage section is within a designated address range to control the access to the storage section. Incidentally, when the address range is allocated overlappingly to the storage sections different from each other, the access to the own memory is controlled by another control signal (signal for memory selection or the like). In terms of application software, data transfer to the process bus communication unit 11, the protection and control unit 12, the digital data merging unit 13, and the communication unit 14 for component control devices in the digital protection and control device 1 means to store the data in the storage sections allocated on the address space. As for the application software, it is only necessary that a memory area on which the data is stored is determined according to the kind of the transmission/reception data, and the transmission/reception data is taken out from or written on the memory area. Therefore, application programming is facilitated.

For example, in the structure shown in FIG. 2 or the like, the process bus being the serial bus typically couples the units to one another. Therefore, Ethernet LAN technology having a unique protocol (TCP/IP, UDP, or the like) is often applied.

In this case, data exchange among the units is managed based on IP addresses. A transmitting side assembles a data frame according to a predetermined rule and a receiving side in turn decomposes the data frame to store it in the memory or the like managed by the receiving side. A specialized LAN control circuit is sometimes used for the generation or the like of the frame structure.

In this embodiment, the process bus communication unit 11, the protection and control unit 12, the digital data merging unit 13, and the communication unit 14 for component control devices are all coupled by the common parallel bus P-NET. Instead, only the specific units may be coupled by the parallel bus or the units may be coupled by the plural parallel buses. Data can be exchanged between these specific units by transferring the data to the storage section, and this is also a modification example of this embodiment.

This embodiment is also applicable to the case when the serial bus, instead of the parallel bus P-BUS, is used for connection. Extremely effective use can be made of this embodiment since the units need not be connected by LAN having a unique protocol.

Note that this embodiment is applicable to all the structures exemplified in the first embodiment and the second embodiment.

(Characteristics of Fourth Embodiment)

In application program software of each of the units in the digital protection and control device 1, data transfer on the storage space (so-called memory map) is made possible without paying any attention to the presence of the transmission bus connecting the units to one another. As a result, application program software involved in the data exchange among the units can be simplified and software quality is also improved.

(Fifth Embodiment)

A fifth embodiment will be explained using FIG. 16. Here, only the digital protection and control device 1 is shown. Since the connection state to the component control devices 3-1 to 3-n and the sensor units 2-1 to 2-n is the same as that in the first embodiment, they are omitted in the drawing. Further, only the components necessary for explaining this embodiment are shown and the description of other components are omitted.

Figure 16:
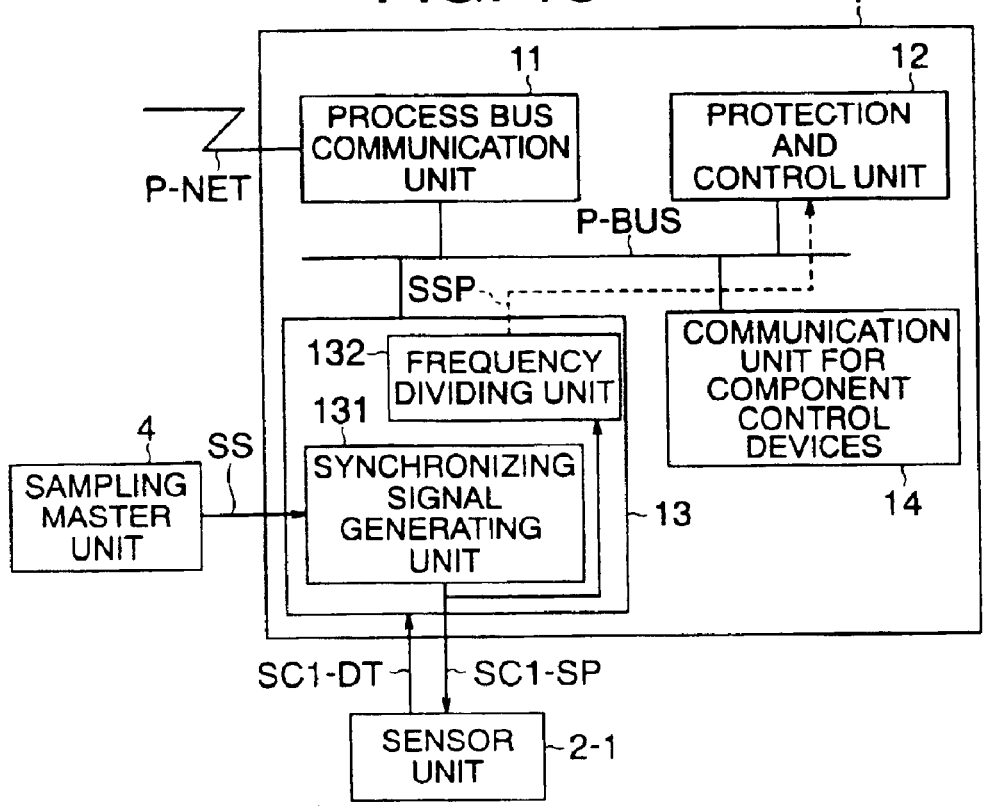
FIG. 16 is a block diagram showing an example of the functional configuration of a fifth embodiment.

The digital protection and control device 1 shown in FIG. 16 has a synchronizing signal generating unit 131 and a frequency dividing unit 132 in the digital data merging unit 13. The synchronizing signal generating unit 131 fetches a reference signal SS from an external sampling master unit 4 used in common by a plurality of digital protection and control devices, and distributes a sampling signal SC1-SP to the sensor units 2-1 to 2-n substantially synchronously. The frequency dividing unit 132 transmits this sampling signal SC1-SP to the protection and control unit 12 after N-frequency-dividing (N: integer) this sampling signal SC1-SP.

This drawing shows a concrete example of connecting the process bus communication unit 11, the protection and control unit 12, the digital data merging unit 13, and the communication unit 14 for component control devices by the common parallel bus P-BUS in the digital protection and control device 1 in the first embodiment and the second embodiment.

Note that the sampling master unit 4 distributes the same reference signal to the plural digital protection and control devices 1. For example, the sampling master unit 4 generates a pulse signal based on a clock signal outputted from a clock oscillator provided therein to distribute the pulse signal via a signal driver circuit.

A GPS (Global Positioning System) satellite may be used for the distribution of the reference signal. Concretely, a pulse signal at one-second intervals is generated from a radio wave received from the GPS satellite and this pulse signal at one-second intervals is distributed as the reference signal SS. This means that a so-called GPS receiving unit is used as the sampling master unit 4. In this case, since a high-precision pulse signal at one-second intervals can be generated not depending on a place, the synchronization of the sampling among the digital protection and control devices inside and outside the substation is facilitated. The synchronization of the sampling between opposed ends is facilitated in a PCM relay of the power transmission line or the like. When time information needs to be appended, time data obtained from a received signal from the GPS can be distributed from the sampling master unit 4.

(Operation in Fifth Embodiment)

Figure 17:
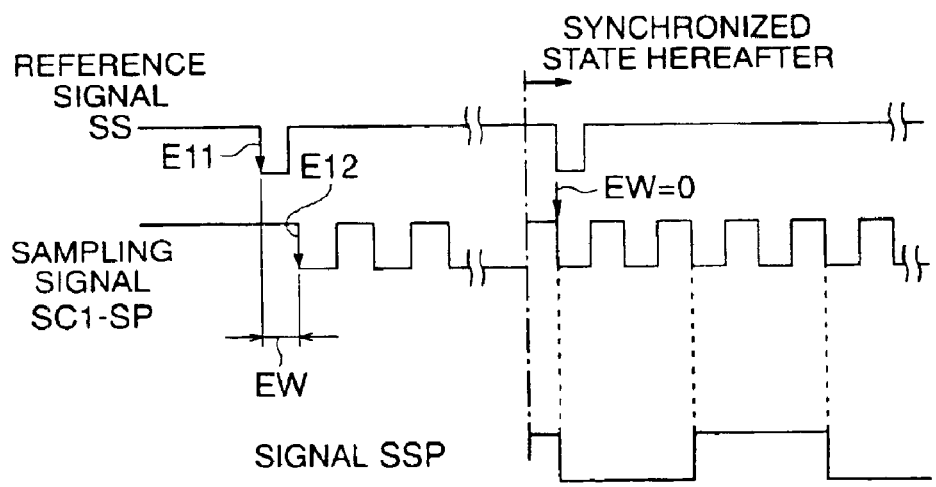
FIG. 17 is a diagram showing an example of how a synchronizing signal is generated in the fifth embodiment.

In FIG. 17, the relationship in timing between the reference signal SS and the sampling signal SC1-SP generated from the reference signal SS is shown. Note that FIG. 17 shows an example where the reference signal SS is four-frequency divided to generate the sampling signal SC1-SP. In the example in this drawing, a discrepancy amount EW between a falling edge E11 of the reference signal SS and a falling edge E12 of the sampling signal SC1-SP is measured with a predetermined cycle counter and this discrepancy amount EW is corrected. As a result, the discrepancy amount is theoretically corrected to "0" (in actual practice, the discrepancy amount within a predetermined range is more preferable than "0" because of easiness of hardware control). The discrepancy amount is detected and corrected at every cycle of the reference signal SS to keep both signals synchronized.

The sensor unit 2-1 detects a rising edge or a falling edge of the pulse signal included in the received sampling signal SC1-SP and in synchronization with this detection, it performs an A/D converting process (namely, a switching process by a multiplexer and a series of the A/D converting process) of a plurality of electricity quantities of the substation main equipments. This means that the AC electricity quantities of the main circuits are sampled with the same period as that of the sampling signal SC1-SP. Digital data SC1-DT sampled at this time is transmitted to the digital data merging unit 13 in sequence. Note that all the digital data SC1-DT sampled during the period before the start of the subsequent sampling (the detection of the next edge) is transmitted to the digital data merging unit 13.

All the above-described processes are implemented by the combination of the digital protection and control devices and the sensor units, and these processes are synchronized with the reference signal from the common sampling master unit 4. As a result, protection and control synchronized with the sampling of the electricity quantities is realized in the substation. In the protective relay arithmetic operation scheme, the electricity quantity of the other end needs to be taken in through a transmission medium such as a process bus in order to protect the bus line and the voltage transformer. Therefore, in the protective relay arithmetic operation scheme, synchronization of the fetching of the electricity quantities among the main-circuits (sampling synchronization) is required in order to ensure precision of the protective performance. The fifth embodiment can easily realize this synchronization.

Further, in the digital protection and control device 1, the N-frequency-divided signal synchronized with the sampling signal SC1-SP can be utilized as the reference signal SSP for the protective relay arithmetic operation by the protection and control unit 12.

The protective relay arithmetic operation is executed based on sampling data (generally, time-series data) of the electricity quantities, but the period of the protective relay arithmetic operation is not always the same as the aforesaid sampling period. For example, the electrical angle of the sampling period is 7.5 and the electrical angle of the arithmetic operation period is 30. Relay performance is often improved by setting the sampling period as the oversampling period relative to the period of the arithmetic operation. In this case, the period of the arithmetic operation is made equal to N times (N: integer) the period in synchronization with the sampling period in this embodiment. In the above example, the electrical angle of the sampling period is 7.5 while the electrical angle of the arithmetic operation period is 30. Therefore, by four-frequency-dividing the sampling signal, the reference signal SSP for the relay arithmetic operation can be obtained.

When the reference signal SSP for the relay arithmetic operation and the sampling signal SC1-SP are not synchronized, the timing at which the electricity quantity data is transmitted to the protection and control unit 12 from the sensor units via the digital data merging unit 13 does not coincide with the timing of the protective relay arithmetic operation by the protection and control unit 12. At this time, the fetching of the necessary time-series electricity quantities is delayed or failed so that the protective relay performance is difficult to be stabilized.

When the period of the relay arithmetic operation is not integer times the sampling period, an interpolation process or the like becomes necessary at the time of the relay arithmetic operation, which tends to increase the burden of the arithmetic operation.

As is described above, the period of the protective relay arithmetic operation is synchronized with the sampling period and is made equal to integer times the sampling period so that the performance of the protective relay can be ensured.

Note that the digital protection and control device 1 in this embodiment can be constituted of one accommodation rack or panel so that the transmission distance of the reference signal SSP is short. Accordingly, no special noise countermeasure needs to be taken so that the signal distribution can be facilitated. With the structure of the digital protection and control device 1a shown in FIG. 10, the signal distribution is possible by the pattern wiring utilizing the parallel bus P-BUS on the backboard, which is extremely safe. However, exclusive lines may be wired in the device, if inside the same rack. In the case of the plate structure shown in FIG. 11, the wiring in the plate is generally within 1 m at longest and the use of a shielded cable or the like is sufficient.

This embodiment is applicable to all the structures exemplified in the first embodiment and the second embodiment.
(Characteristics of Fifth Embodiment).

When the protection and control unit 12, the digital data merging unit 13, and the component control devices 3-1 to 3-n are individually coupled to the process bus, the process bus generally has the structure of LAN (Local Area Network), and the operations of the devices and units are asynchronous with one another. In this case, coordination among the devices and units becomes difficult, which sometimes makes it difficult to ensure time performance (time performance concerning the appending of time information to a status value of the protective relay and the substation equipment, concerning information transmission to a higher-order system, and the like) of protection and control as the substation system.

In the digital protection and control device in this embodiment, the protection and control unit 12, the digital data merging unit 13, the process bus communication unit 11, and the communication unit 14 for component control devices are accommodated in one device, and some of the units are connected via the parallel bus P-BUS where necessary. This facilitates the coordination in data fetching and arithmetic operation timing among the units connected by the parallel bus P-BUS. Further, the signal for the protective relay arithmetic operation period (the reference signal which is synchronized with the sampling of the sensor unit and whose period is made integer times) necessary for managing the time for the protective arithmetic operation can be easily distributed and shared.
(Sixth Embodiment)

A sixth embodiment will be explained with reference to FIG. 18. Here, only the digital protection and control device 1 is shown. Since the component control device 3-1 to 3-n and the sensor units 2-1 to 2-n are the same as those in the first embodiment, they are omitted in the drawing. Only the components necessary for explaining this embodiment are shown and the description on other components is omitted.

Figure 18:
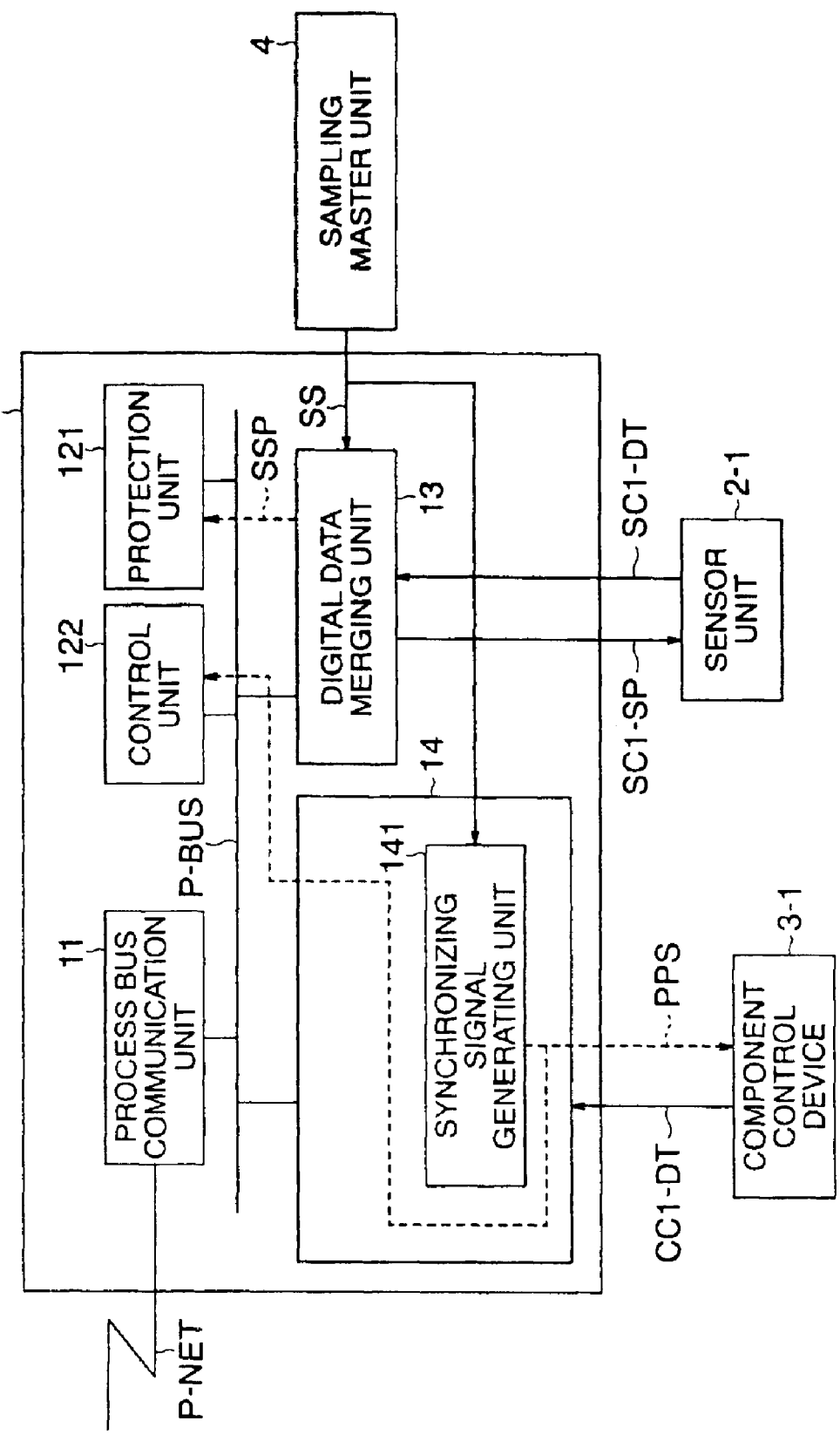
FIG. 18 is a block diagram showing an example of the functional configuration of a sixth embodiment.

As shown in FIG. 18, the digital data merging unit 13 takes in the reference signal SS from the external sampling master unit 4 and distributes the sampling signal SC1-SP required by the sensor units 2-1 to 2-n substantially synchronously. Further, the digital data merging unit 13 N-frequency-divides (N: integer) the sampling signal SC1-SP and distributes the N-frequency-divided signal SSP to the protection unit 121 in the protection and control unit 12. A synchronizing signal generating unit 141 in the communication unit 14 for component control devices takes in the reference signal SS from the sampling master unit 4, generates a reference signal PPS for time synchronization that synchronizes with this reference signal SS, and distributes this signal to the component control devices 3-1 to 3-n and the control unit 122 in the protection and control unit 12 substantially synchronously.

This drawing shows an example where the process bus communication unit 11, the protection and control unit 12, the digital data merging unit 13, and the communication unit 14 for component control devices are connected by the common parallel bus P-BUS, in the digital protection and control device 1 in the first embodiment and the second embodiment.

(Operation in Sixth Embodiment)

Since the processing of the signal SSP for determining the period of the relay arithmetic operation of the protection function is the same as that in the fifth embodiment, the explanation thereof will be omitted. Hereinafter, only the process on the control unit 122 side will be explained.

The control unit 122 takes in the reference signal PPS for time synchronization. In FIG. 18, this signal PPS is transmitted via the parallel bus P-BUS in the device, but an exclusive line in the device or a wiring pattern on the printed board may be used. The reference signal PPS for time synchronization can be generated from the reference signal SS in the same method as that used in the example shown in FIG. 17.

The time for component control is synchronized with the time for sampling a status event of the substation main equipment side. This synchronization in time generally has the 1 msec precision (resolution). This precision is demanded in sampling the status event and appending the time information.

Accordingly, in order to satisfy such control specs, the reference signal for time synchronization needs to be a pulse signal at least at 1 m second intervals. This pulse signal PPS at 1 m second intervals is shared by the component control devices 3-1 to 3-n and the control unit 122. Since the time information is appended to the detected status event based on the period of this signal, the control with the precision of 1 m second is possible by the control unit 122. Also in the component control devices 3-1 to 3-n, the sampling of the component status (oil pressure, gas pressure, open/close of the circuit breaker, and so on) and the appending of the time information with the precision of 1 m second are also possible. Incidentally, when the component control devices 3-1 to 3-n append the time information to sampling information, the distribution of time data to the component control devices 3 is required.

As a modification example of FIG. 18, it is also suitable that the sampling in the component control devices 3-1 to 3-n is performed by oversampling with the period of 1 m second or more and the communication unit 14 for component control devices which has taken in this oversampling data CC1-DT appends the time information to this data. In this case, the component control devices 3-1 to 3-n do not require the reference signal PPS for time synchronization. The communication unit 14 for component control devices appends the time information to the received oversampling data, which is thinned out, based on the time when this data is received. In appending the time information, a realtime clock in the own unit may be utilized or high-precision data received from GPS which does not require time adjustment may be used.

FIG. 18 shows an example where the protection and control unit 12 is divided into the protection unit 121 and the control unit 122. However, this embodiment is also applicable to the case when the same hardware is used in common (in other words, in the case when the same arithmetic processing section executes arithmetic operations both for protection and control). This structure can be realized in such a manner that the same arithmetic operation section utilizes two signals for arithmetic operation period (protective relay arithmetic operation and arithmetic operation for appending the time to the status change) and causes different program tasks for the respective arithmetic operations to operate.

This embodiment is applicable to all the structures exemplified in the first embodiment and the second embodiment.

(Characteristics of Sixth Embodiment)

With one device, it is possible to realize time synchronization for the protection function and the control function whose synchronization timings are different. The reference signal for synchronization necessary for the protection function and the reference signal for synchronization necessary for the control function are distributed and shared in one device so that time performance of protection and control can be ensured while the protection function and control function can be operated independently from each other.

Consequently, even when, for example, the protection function is defective and thus this function cannot be maintained, the control function independently operating is not lost. This applies to the reverse case.

(Seventh Embodiment)

A seventh embodiment will be explained with reference to FIG. 19. Here, only the digital protection and control device 1 is shown. Since the connection state to the component control devices 3-2 to 3-n and the sensor units 2-2 to 2-n is the same as that in the first embodiment, they are omitted in the drawing. Only the components necessary for explaining this embodiment are shown and the description on other components are omitted.

Figure 19:
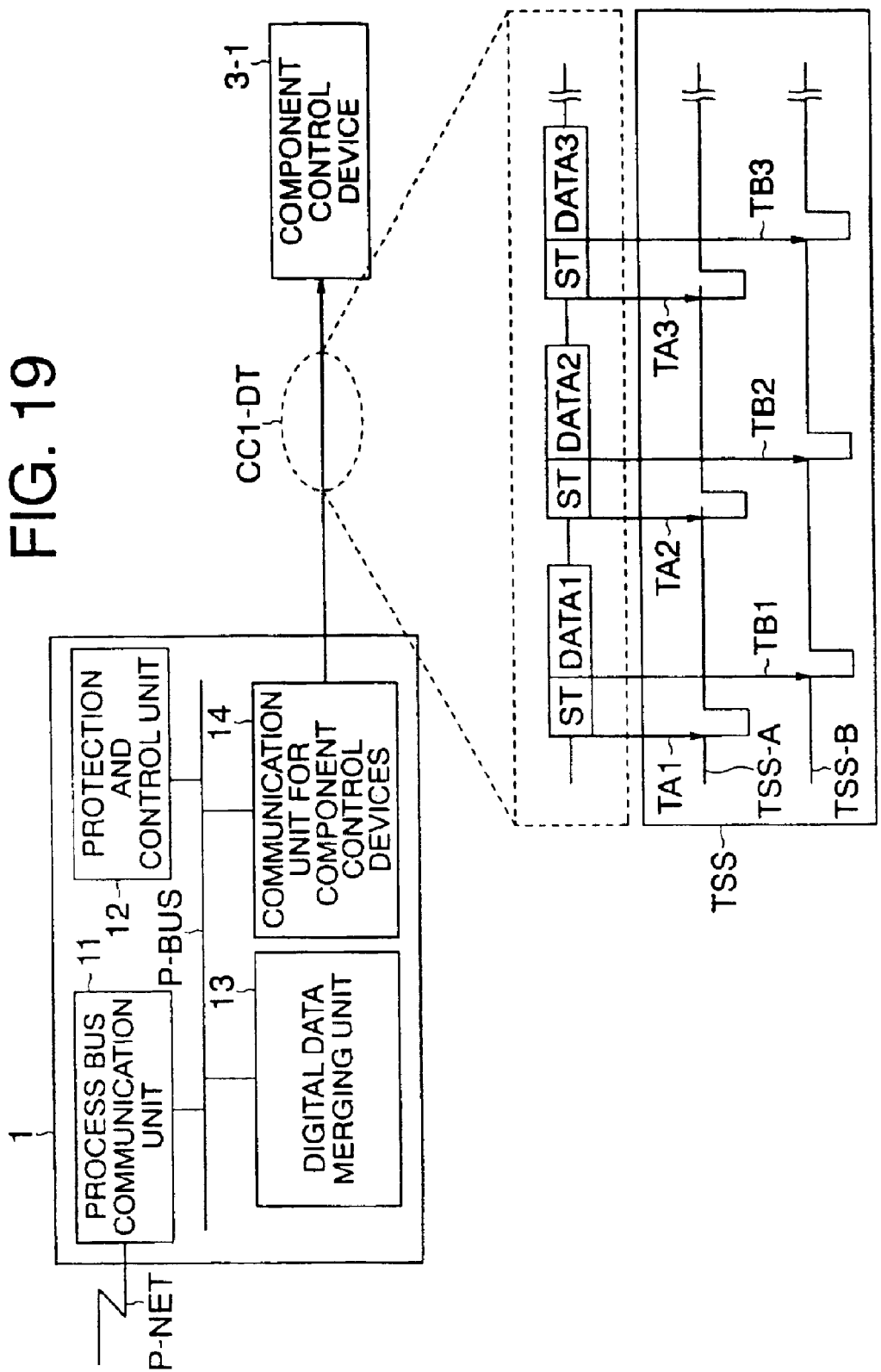
FIG. 19 is a schematic diagram showing a method of a seventh embodiment.

FIG. 19 shows the case when the process bus communication unit 11, the protection and control unit 12, the digital data merging unit 13, and the communication unit 14 for component control devices are connected by the common parallel bus P-BUS, in the first embodiment and the second embodiment.

This drawing shows that the control signal CC1-DT indicating the control command is outputted from the communication unit 14 for component control devices to the component control device 3-1 (point-to-point transmission). The control signal CC1-DT is also outputted by point-to-point transmission to the component control devices 3-2 to 3-n, but this is omitted in the drawing. The component control device 3-1 is shown as a typical one representing the component control devices 3-1 to 3-n.

(Operation of Seventh Embodiment)

The communication unit 14 for component control devices cyclically transmits the control signal CC1-DT indicating the control command to the component control device 3-1 with the period, for example, synchronizing with the time. In the component control device 3-1, the status events (events such as oil pressure, gas pressure, and open/close of the circuit breaker) of the substation equipments are synchronized in time based on the timing at which the control signal CC1-DT is received.

In the component control devices 3-1 to 3-n, a signal indicating the timing (in this case, the timing of 1 m second since the appending of the time information to the status change event often requires the precision of 1 m second) for the time synchronization is necessary. This timing signal (namely, the reference signal for time synchronization) and the signal CC1-DT including the control command (open/close command or the like to the circuit breaker in accordance with fault detection and selection-and-control) are inputted to the component control devices 3-1 to 3-n from the digital protection and control device 1. This means that there are two kinds of downward signals from the digital protection and control device 1 to the component control devices 3-1 to 3-n). An upward signal is component monitor data.

In this case, two transmission cables for the downward signal and one transmission cable for the upward signal are required, and a large number of the digital protection and control devices are installed in the substation. Since many component control devices are connected to one digital protection and control device, the number of the transmission cables in the entire substation becomes large. Further, the component control device side is also coupled to two receiving cables, which accordingly increases the hardware in size.

In this embodiment, one cable is used for the downward transmission so that the number of the cables can be reduced and the number of receiving ports of the component control devices can be reduced.

To be more specific, the timing for time synchronization and the control command are transmitted to the component control device 3-1 using one cable. This state is shown in the bold-line frame TSS in FIG. 19.

The control signal (constituted of a plurality of bits) indicating the control command includes as a minimum structure a start bit ST (or start flag sequence) indicating the start of data and a control command DATA. This control signal is cyclically transmitted at the timing (for example, 1 m second period) synchronizing with the time. This timing signal synchronizing with the time may have a high frequency (short period) to have a precision higher than required. In this case, the component control device frequency-divides the high-frequency timing signal when necessary and restores it to a necessary timing signal for time synchronization.

The control command is transmitted with the abovementioned period irrespective of the presence or non-presence of the command. When no command exists, a signal indicating "no command exists" may be appended or a control signal retaining the previous signal may be transmitted.

In the TSS portion shown in the drawing, a signal receiving process in the component control device 3-1 is shown. Based on start timings (TA1, TA2, TA3) of the respective start bits ST of the control signal CC1-DT, a period signal (time synchronization signal) TSS-A is generated. Here, a period signal (time synchronization signal) TSS-B may be generated not based on the start timings of the start bit ST but based on timings (TB1, TB2, TB3) that are instants at which the start bit ST is recognized as a normal start bit (or start flag sequence). The latter has a higher reliability since soundness of the start bit is confirmed.

A binary number "0" and "1" expressed with one bit is usable as the start bit ST. Alternatively, using a start flag sequence of a plurality of bits, a binary number sequence such as, for example, "0001010101" may indicate the start of the signal. Further, by using a signal based on the Manchester transmission or the like in which "1" and "0" are indicated by a switching direction from "0" to "1" and "1" to "0", transmission quality is further improved. Incidentally, information can be transmitted using either of an electric cable and an optical cable.

As described above, with the use of one point-to-point cable, it is possible to cyclically transmit the control signal CC1-DT at the timing synchronous with the time and transfer to the component control device 3-1 the information on the timing synchronous with the time at which the CC1-DT is received.

This embodiment is applicable to all the structures exemplified in the first embodiment and the second embodiment.
(Characteristics of Seventh Embodiment)

Even when the digital protection and control device and the component control devices are separated, synchronization therebetween can be realized. Moreover, any cable exclusive for distributing only the synchronizing signal need not be provided between the digital protection and control device and the component control devices.
(Eighth Embodiment)

Figure 20:
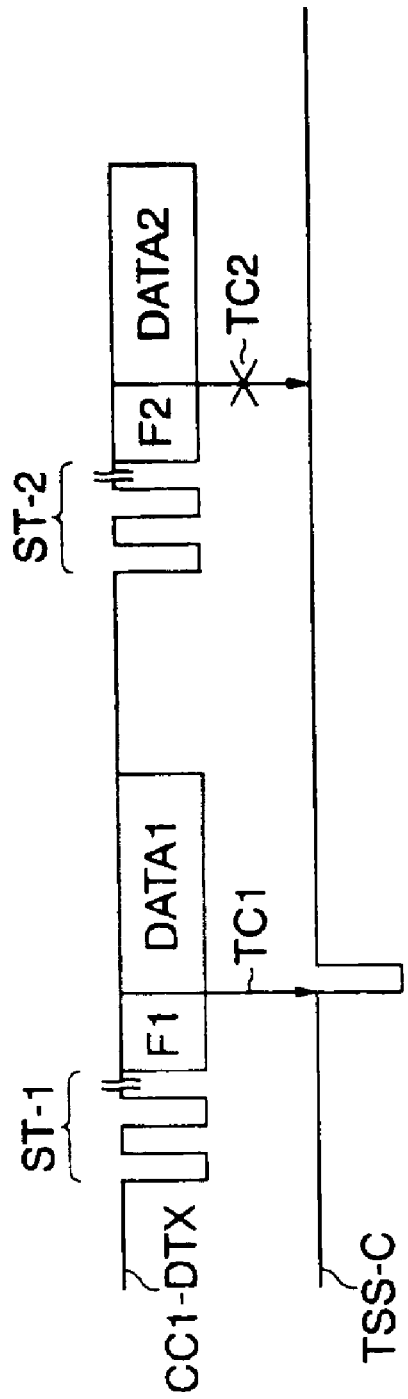
FIG. 20 is a schematic diagram showing a method of an eighth embodiment.

An eighth embodiment will be explained with reference to FIG. 20. Since the digital protection and control device 1, the component control devices 3-2 to 3-n, and the sensor units 2-2 to 2-n are the same as those in the other embodiments, they are omitted. Only a control signal CC1-DTX and a method of the receiving process in the component control device 3-1, which are different from those in the other embodiments, are shown.

This drawing shows the case when the control signal indicating the control command (open/close command to the circuit breaker or the like in accordance with fault detection and selection-and-control) transmitted to an external part from the communication unit 14 for component control devices is the control signal CC1-DTX cyclically transmitted with an oversampling period relative to the timings (for example 1 m second period) synchronous with the time.

The component control device 3-1 restores the timing for time synchronization from the timing of the control signal received with an oversampling period.

A concrete example of a restoring method will be described. As shown in this drawing, the control signal includes a start code ST-1 (it may be a bit or a flag sequence), a time synchronization flag F1, and control command data DATA1, and includes a start code ST-2, a time synchronization flag F2, and control command data DATA2 at a subsequent timing.

The control signal is transmitted with an oversampling period relative to the original time synchronization timing, and therefore, in the case of the time synchronization timing, the time synchronization flags F1 and F2 are expressed with, for example, a bit "1" while other cases are expressed with a bit "0". This may be constituted by a plurality of bits. The component control device 3-1 detects and confirms the time synchronization flags F1 (="1") and F2 (="0") of the received control signal, and only when the time synchronization timing (the bit "1" in the above example) is detected, the pulse of the synchronizing signal is varied at the timing TC1 of the detection. Thus, the synchronizing signal TSS-C is generated.

In this method, since the timing of the time synchronization (starting point) can be discriminated based on the time synchronization flags, the transmission of the control signal with the oversampling period and the transfer of the timing for the time synchronization are possible. In other words, the transmission of the control signal with the oversampling period means high-speed transmission of the control command.

This embodiment is applicable to all the structures exemplified in the first embodiment and the second embodiment.
(Characteristics of Eighth Embodiment)

The digital protection and control device 1 generates the cyclic control signal with the oversampling period relative to the period of the time synchronization, and outputs this cyclic control signal, appending identification data to the cyclic control signal at every period synchronous with the time. The component control device 3-1 receiving this cyclic control signal discriminates the identification data at the receiving timing of the cyclic control signal and synchronizes the status event of the substation equipment with the identification data.

Consequently, not only the characteristics similar to those in the seventh embodiment are obtainable, but also the control command can be transmitted at a high speed since the control command is cyclically transmitted to the component control device 3-1 with the oversampling period relative to the period of the time synchronization. This enables a high-speed open/close command to the switchgear or the like upon detecting a fault and at the same time, enables the component control device 3-1 to realize time synchronization.

(Ninth Embodiment)

A ninth embodiment will be explained with reference to FIG. 21. Since the connection state to the sensor units 2-1 to 2-*n* is the same as that in the first embodiment, they are omitted in the drawing. Only the components necessary for explaining this embodiment is shown and the description on other components is omitted.

Figure 21:
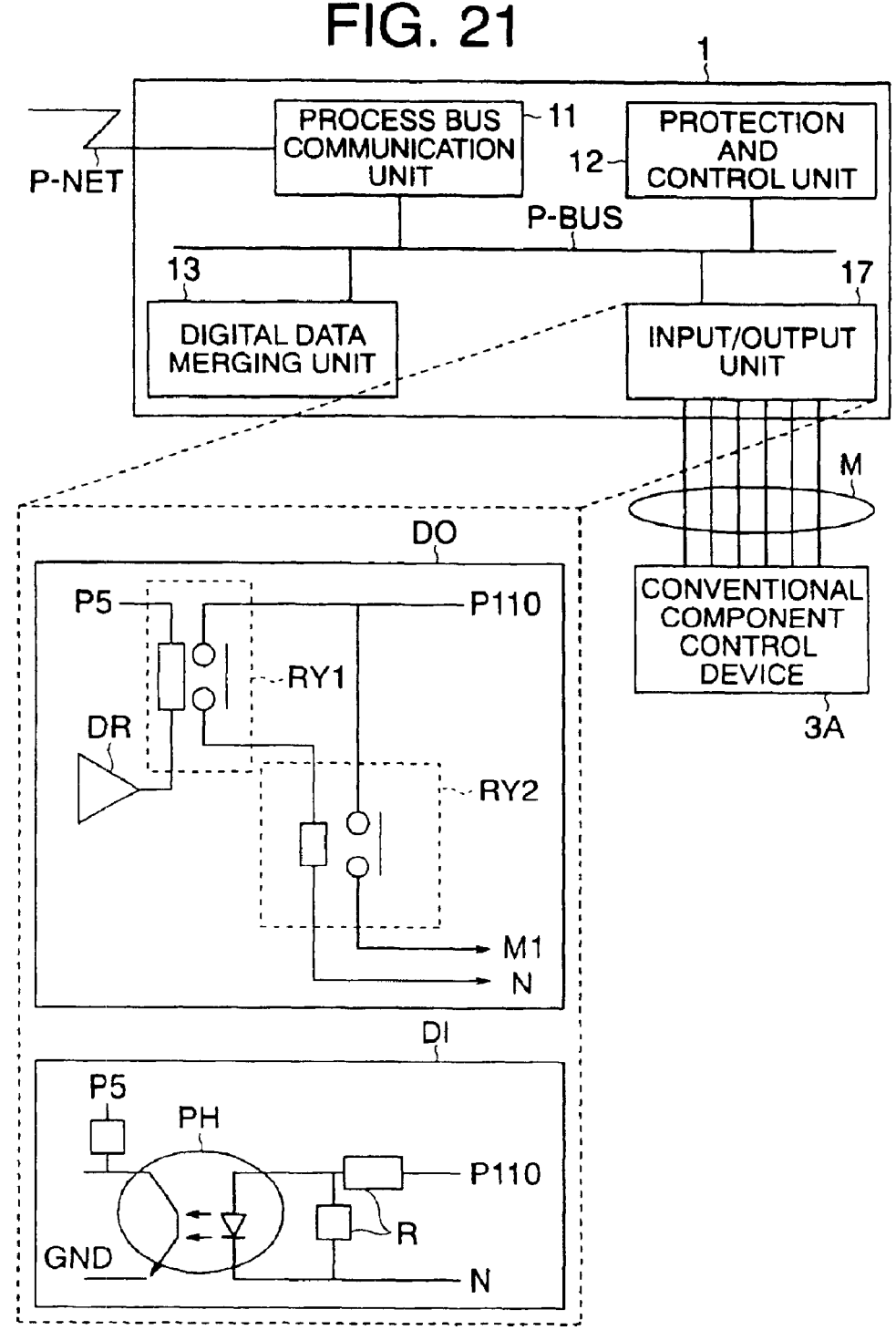
FIG. 21 is a block diagram showing a first example of the functional configuration of a ninth embodiment.

FIG. 21 shows the case where the communication unit 14 for component control devices is replaced by an input/output unit 17, in the first embodiment and the second embodiment. The input/output unit 17 is connected to the process bus communication unit 11, the protection and control unit 12, and the digital data merging unit 13 by the common parallel bus P-BUS.

The input/output unit 17 ON/OFF outputs the control command by a mechanical or static relay section to a component control device 3A via a metal wire group M and ON/OFF inputs thereto data input from the component control device 3A in an insulated input section. The component control device 3A in this case corresponds to the conventional local control device (denoted by the reference symbol Z9-1 in FIG. 1).

(Operation in Ninth Embodiment)

The operation of the input/output unit 17 will be explained based on the explanatory functional diagram shown in the broken-lined frame in FIG. 21 (only an input and an output section, which are necessary for explanation, are shown).

In an output section DO, a coil of a mechanical relay RY1 is excited by a DC power supply P5 in accordance with "0" output from a driver DR in the device, and a contact is closed to drive the relay RY1. When the contact is closed, a DC power supply P110 in the substation led from the outside of the device is electrically connected to the component control device 3A through the metal wire M. The DC power supply P110 may also be electrically connected in such a manner that a miniature relay is employed as this relay RY1 and a power relay RY2 having a high relay open capacity tentatively receives the power supply. Since this power relay (also called a switching relay) RY2 handles a large capacity current (from several amperes to several tens amperes) compared with an electronic circuit, it may be mounted outside the digital protection and control device 1 to be separated from a digital unit being a low voltage section.

Here, instead of using the mechanical relay, the DC power supply P110 may be electrically connected by a static power field-effect transistor (also called a power FET) or a thyristor element.

As a noise-proof measure by means of electrical insulation from external input, it is also possible to use a photocoupler PH or the like as an input section DI and to input external information by voltage (voltage between the DC power supply P110 and a ground N) applied thereto. The input sensitivity of the photocoupler PH is often determined by voltage division by a resistor R. The adjustment of the sensitivity of the photocoupler PH determines input voltage as a border between ON and OFF. This photocoupler PH takes in the binary state of "0" and "1" at a voltage easy to handle in the electronic circuit by a pullup of the power supply P5 and the ground GND in the digital protection and control device 1.

In the case when the voltage is inputted, the problem concerning noise proof or voltage drop sometimes occurs due to the arrangement of the external metal wire. At this time, it is also possible that the signal from the metal wire M is tentatively received in the relay and the voltage is inputted by opening/closing of a contact of this relay.

With the above-described structure, the input/output unit 17 is capable of outputting the control command received from the protection and control unit 12 via the parallel bus P-BUS to the component control device 3A. Further, component information from the component control device 3A can be also inputted thereto.

In FIG. 21, the input/output unit 17 is connected to the common parallel bus P-BUS. Instead, the input/output unit 17 may be connected to the protection and control unit 12 via an exclusive parallel bus P-BUS3 or a serial bus S-BUS3 to be separated from the common parallel bus P-BUS. This structure is shown in FIG. 22.

The advantage of the structure shown in FIG. 22 is that the separation of the transmission line P-BUS3 for the control command from the parallel bus P-BUS prevents the transmission of the control command from being influenced by the transmission on the parallel bus P-BUS. For example, the influence of the transmission of the AC electricity quantity data to the protection and control unit 12 from the digital data merging unit 13, and the like is considered. This makes it possible to improve time performance of the control command (for example, the time required for transmitting the selection-and-control and the response time to a fault).

This embodiment is applicable to all the structures exemplified in the first embodiment and the second embodiment only by replacing the communication unit 14 for component control devices by the input/output unit 17.

(Characteristics of Ninth Embodiment)

Even when the interface of a component control device is not adaptable to the digitalization of a transmission medium (conventional component control device), by connecting the component control device to the digital protection and control device of the present invention via the metal wire or the like, information transmission (including the control command) is made possible. Incidentally, the use of DC 110 V being a direct power supply in the substation is standard for input and output of the ON/OFF information. However, non-standard voltage may be used.

The digital protection and control device in the first embodiment or the second embodiment can be applicable to a digital system (substation equipment system) in which components are coupled by a transmission medium. In actual practice, however, it is expected that transitional time is necessary before the digital communication in which the components are coupled by the transmission medium is realized for all the transmission in the substation (or power station) premises, and the digital transmission gradually replaces the conventional transmission by the expansion, replacement, and the like of the substation equipment. In this case, this embodiment can be effectively utilized in such a transitional period since the digital protection and control device 1 in this embodiment is connectable to the conventional component control device.

(Tenth Embodiment)

A tenth embodiment will be explained with reference to FIG. 23. Since the connection state to the sensor units 2-1 to 2-n is the same as that in the first embodiment, they are omitted in the drawing. Only the components necessary for explaining this embodiment are shown and the description on other components is omitted.

FIG. 23 shows the case when, in the first embodiment and the second embodiment, the communication unit 14 for component control device, the process bus communication unit 11, the protection and control unit 12, and the digital data merging unit 13 are connected by the common parallel bus P-BUS.

The communication unit 14 for component control devices in this embodiment is connected to an external input/output unit 17A by a transmission medium CC1 (for example, a point-to-point serial transmission path exclusively used for downward transmission). This input/output unit 17A is further connected to the component control device 3A by the metal wire M. The component control device 3A corresponds to the conventional local control device (denoted by the reference symbol Z9-1 in FIG. 1). Since the structure and operation of input/output between the input/output unit 17A and the component control device 3A are the same as those in the ninth embodiment, the explanation thereof will be omitted.

Note that the structures of the output section DO and the input section DI of the input/output unit 17A are the same as those in FIG. 21.

(Operation in Tenth Embodiment)

This embodiment is different from the ninth embodiment in that the communication unit 14 for component control devices is provided in the digital protection and control device 1 and the input/output unit 17A externally provided is used as a relaying unit, thereby realizing the interface with the conventional component control device 3A. More specifically, since the control command from the digital protection and control device 1 to the component control device 3A (open/close command to the switchgear in fault detection and selection-and-control, and the like) is a digital signal utilizing a transmission medium, it is received in a communication control section in the input/output unit 17A, where the kind or the like of the control command is decoded. Then, the voltage applied to one of the metal wires M of a corresponding output section is turned on/off to transmit the command to the component control device 3A.

Upward information (component status change or the like) from the component control device 3A is also transmitted via a corresponding one of the metal wires M and inputted to the input/output unit 17A by the ON/OFF operation. The inputted information is transmitted to the digital protection and control device 1 through the transmission medium CC1 (for example, the point-to-point serial transmission path exclusively for upward transmission, or the like) as component monitoring digital data via the communication control section.

This embodiment is applicable to all the structures exemplified in the first embodiment and the second embodiment.

(Characteristics of Tenth Embodiment)

The external input/output unit 17A can connect the conventional component control device 3A and the digital protection and control device 1 by relaying the information transmission therebetween. Component control devices are often of the conventional type in the transitional period of the shift to digitalization. The system configuration in this case can be such that the input/output unit 17A is used for relaying and connection, and upon completion of the shift to digitalization, it is only necessary to remove the input/output unit 17A and to connect the component control device 3A and the digital protection and control device 1 again.

Since the ON/OFF input and output sections are high voltage sections of DC 110 V class, they have to be large in size considering surge withstand voltage. In this embodiment, since the input/output unit 17A is externally disposed to be separated from the digital protection and control device 1, it does not influence the size of the protection and control device 1. Further, the input/output unit 17A, even when increased in size, can be installed in a place where space can be secured since it is separated from the digital protection and control device 1.

(Eleventh Embodiment)

The eleventh embodiment will be explained with reference to FIG. 24. Since the connection state to the sensor units 2-1 to 2-n and the component control devices 3-1 to 3-n, and the units 1 to 14 in the digital protection and control device 1 are the same as those in the first embodiment, they are omitted in the drawing. Components necessary for explaining this embodiment are only shown.

In this drawing, a rack 10F to accommodate a digital protection and control device, a fan unit 6, and a temperature sensor HE connected to the fan unit 6 are shown, the rack 10F having a ventilation hole UH on an upper face and a ventilation hole LH on a bottom face. W1 to W4 show flows of air.

As the fan unit 6, a blade is rotated with a motor to send an air, which is then sucked in from the ventilation hole LH on the bottom face and forced to be discharged from the ventilation hole UH on the upper face. In order to utilize this forced air cooling system, a ventilation passage to optical parts mounted in the rack 10F is secured. This results in restraint of the deterioration of the optical parts due to the temperature and in longer lifetime thereof.

The fan unit 6 also may suffer abrasive deterioration since it is generally a bearing fan. In order to retard this deterioration, the ambient temperature of the rack 10F is monitored by the temperature sensor HE or the like and the air is sent only when the ambient temperature has a predetermined value so that the total operating time of the fan unit 6 can be saved. Not depending on the temperature sensor, the air may be sent or stopped as planned based on time. For example, the air is sent only by day and not sent by night.

Since the digital protection and control device 1 is usually in continuous use for several ten years or more, the increase in fault rate of the device needs to be avoided. The fault rate of optical parts is one-digit higher (about several hundred Fit) compared with other electronic parts. Optical parts wear out due to current in a light emitting portion. In addition, since the current is dependent on the temperature, current consumption is increased in a high temperature state to further wear out the light emitting portion.

In a digitalized protection and control system in a substation in which components thereof are coupled by transmission mediums, more optical cables are used than electrical cables in order to ensure communication quality. Accordingly, many optical parts are used in an optical transmission portion, which results in the tendency that the fault rate of the device becomes higher.

In such a protection and control system greatly depending on optical communication, the deterioration of the optical parts leads to the deterioration of the system, which turns out to be a bottleneck for lengthening MTBF (mean time between faults) of the system. Therefore, it is necessary to retard the deterioration of the optical parts to improve the fault rate of the device. For this purpose, it is preferable to lower the temperature of the optical parts by forced air cooling.

(Operation of Eleventh Embodiment)

Figure 24:
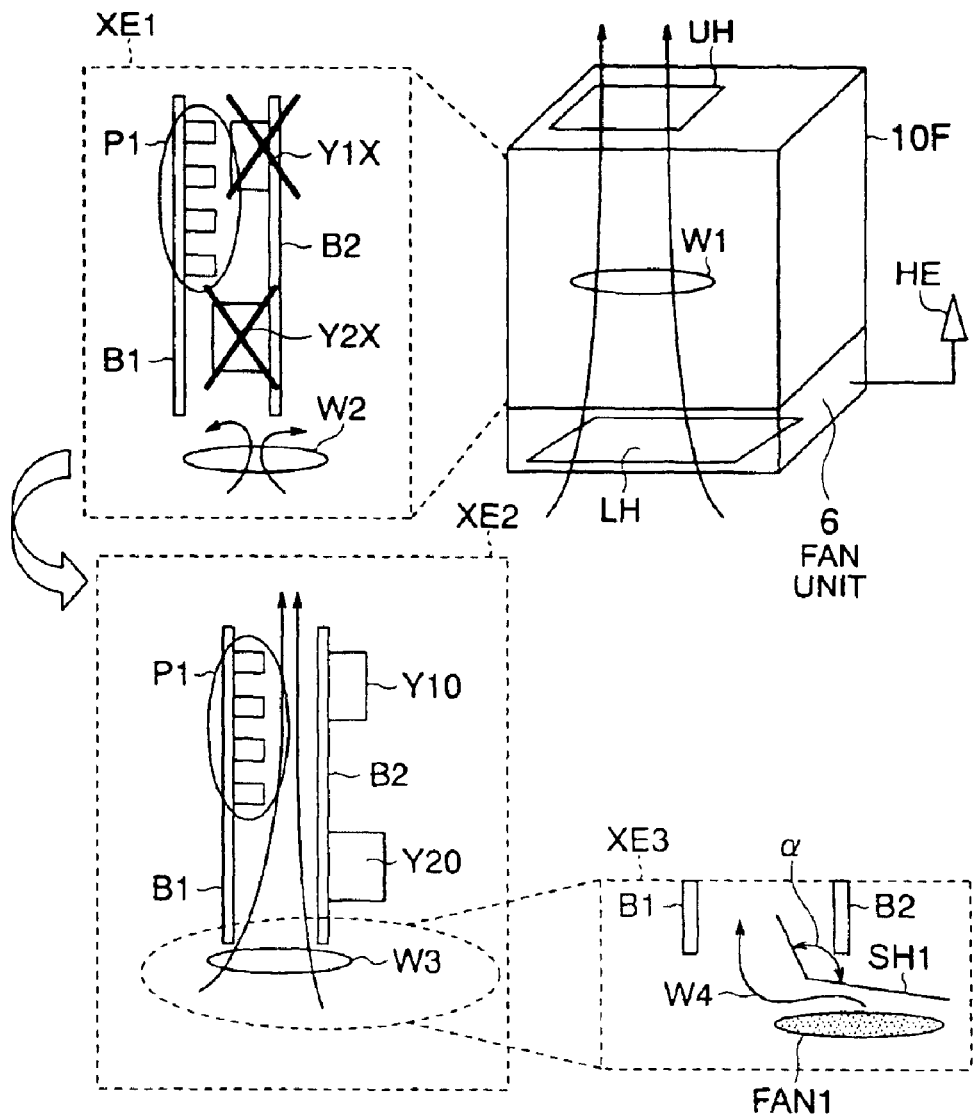
FIG. 24 is a diagram showing a configuration and a method of an eleventh embodiment.

A fragmentary view XE1 in FIG. 24 shows a part of hardware in the accommodation rack 10F. This is an example of mounting an optical part P1 on a printed board B1 and parts Y1X and Y2X on a printed board B2. In this case, the parts Y1X and Y2X obstruct the air W2 sent from the bottom face to prevent the air from being sent to the optical part P1.

On the other hand, in a fragmentary view XE2, the part mounting positions on a printed board B2 are Y10 and Y20 to secure a ventilation passage to the optical part P1 so that the air W3 flows from the bottom face to the upper face without any resistance.

Further, as shown in a fragmentary view XE3, an air deflecting plate SH1 may be disposed at a predetermined angle so that the air W4 from a fan portion FAN1 flows efficiently between the printed board B1 and the printed board B2.

As is described above, the fan unit 6 is mounted and the ventilation passage to the optical part P1 is secured so that the fault rate of the digital protection and control device 1 is improved.

This embodiment is applicable to all the structures exemplified in the first embodiment and the second embodiment.

(Characteristics of Eleventh Embodiment)

It is possible to reduce the fault rate of optical transmission parts having a high fault rate compared with electric and electronic parts. This embodiment is especially effective when the digital protection and control device 1 is mounted in or near the substation main equipment, when it is provided in an outdoor chassis or the like, or when it is installed in an indoor control room or the like, though apart from substation equipment, having no air-conditioning facility provided therein. Here, this embodiment is also effective when the digital protection and control device 1 is installed in a room provided with the aforesaid air-conditioner. Only the effect relatively varies depending on the installation environment.

Since the fanning is controlled according to the ambient temperature of the installation environment, constant continuous operation of the fan unit 6 can be avoided and the progress of the deterioration of a movable portion of the fan unit 6 can be retarded. Further, the ventilation passage is secured for realizing efficient forced air-cooling of the optical transmission portion so that it can be prevented that a fanning effect is held back.

The application of this embodiment results in the improvement in MTBF of the entire protection and control system in a substation constituted as an optical communication system.

(Twelfth Embodiment)

A twelfth embodiment will be explained with reference to FIG. 25. The connection state of the process bus communication unit 11 to the digital data merging unit 13 inside the protection and control device 1, and the connection state to the component control devices 3-2 to 3-n and the sensor units 2-1 to 2-n are the same as those in the first embodiment, and therefore, they are omitted in the drawing. Components necessary for explaining this embodiment are only shown and the description on other components is omitted.

Figure 25:
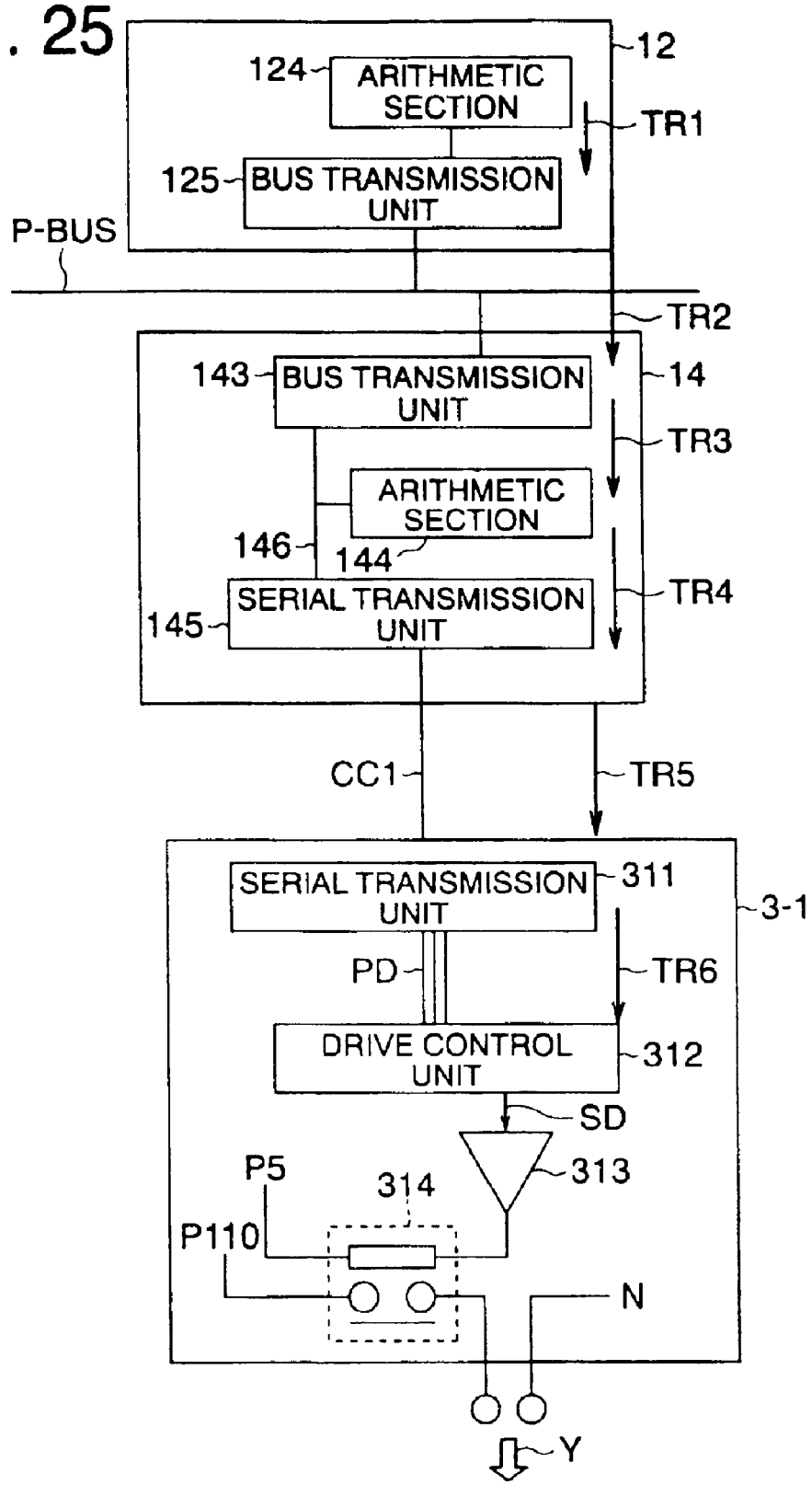
FIG. 25 is a diagram for explaining a transmission route of a control command in a twelfth embodiment.

FIG. 25 shows a transmission path of the control command (open/close command to the switchgear in accordance with fault detection and selection-and-control, or the like) to the substation equipment. The protection and control unit 12 of the digital protection and control device 1 executes the protective relay arithmetic operation based on the AC electricity quantities of the main circuits of the substation main equipment, which are taken in via the digital data merging unit 13, and outputs an open/close command (including a re-close command) to the switchgear upon detecting a fault. It also receives the control command for component selection from the higher-order system via the station bus S-BUS and outputs the selection command and the control command to the substation equipment.

These commands are processed in an arithmetic section 124 of the protection and control unit 12 (protection and control may be separated as shown in FIG. 7) and are outputted from a transmission control section 125 of the parallel bus P-BUS to the communication unit 14 for component control devices. The control signal indicating this control command undergoes a reception process in a bus transmission unit 143 and is relay-processed in an arithmetic section 144. Thereafter, after passing through an internal bus 146, a serial transmission unit 145, and the point-to-point serial transmission path CC1, the control signal undergoes a reception process in a serial transmission section 311 of the component control device 3-1.

Note that the transmitted control signal is a command constituted of, for example, a binary number sequence of a plurality of bits. This command is converted to parallel data in the serial transmission section 311 to be transferred to a drive control unit 312 via an internal bus PD. In the drive control unit 312, error check is executed for this command. When there is no error, a driving signal SD is outputted to a driver 313 and is turned to a control output Y on a final stage by a power relay unit 314. This drawing shows a mechanical power relay so configured that the power supply P5 and the driver 313 in the component control device excite the coil to close the contact so that electrical connection to the power supply P110 is established. A static thyristor, a power FET, or the like may be used in place of the mechanical power relay.

Based on this control output Y, the open/close state of the circuit breaker, disconnecting switch, and so on is controlled.

(Operation of Twelfth Embodiment)

The above-described process flow from a transmitting end to a final receiving end of the control command is summarized as the following route.

from the arithmetic section 124 to the bus transmission unit 125: the arrow TR1 from the bus transmission unit 125 to the bus transmission unit 143: the arrow TR2 from the bus transmission unit 143 to the arithmetic section 144: the arrow TR3 from the arithmetic section 144 to the serial transmission unit 145: the arrow TR4 from the serial transmission unit 145 to the serial transmission unit 311: the arrow TR5 from the serial transmission unit 311 to the drive control unit 312: the arrow TR6

Since the above flow from TR1 to TR6 passes through several units and transmission paths, data quality of a command expressing the control command with the plural bits is very important. When there are several units and transmission paths from the transmitting end to the final receiving end, an occurrence rate of bit errors in the command due to a defect (including a temporal defect) of a part of these units or transmission paths is increased. This will increase the rate that the control signal output Y being erroneous on the final stage due to the command including the error.

An effective method for avoiding this situation is such that the command is constituted based on a predetermined rule in the digital protection and control device 1 and error check is executed in the drive control unit 312 on the final stage based on the rule.

As the predetermined rule in the case, for example, when the control command is constituted of 8-bit binary numbers, it is possible to use a method of appending one bit for error detection as a parity bit or a method of appending an error correction code (ECC code) to the control command for error detection. Alternatively, available is a method of appending a predetermined flag sequence to the command and judging that no defect exists when the drive control section 312 confirms that this flag sequence is not destructed. Further available is a method of appending a bit flipping sequence to a bit sequence of the control command and checking in the drive control unit 312 whether the arrangement of the control command and the bit flipping sequence is kept. It should be noted that this embodiment is not limited to the error check methods explained above.

Various techniques are available for detecting transmission errors on transmission paths. In this embodiment, the control command is constituted based on a predetermined rule in the transmitting end of the control command (or in a predetermined unit in the digital protection and control device 1). Consequently, it is possible to detect an error of the command in the drive control unit 312 on the final stage without depending on where a defect occurs in the units or the transmission paths.

Incidentally, when an error is detected in a command, the drive control unit 312 discards this command and does not execute the command. Instead, it answers the digital protection and control device 1 via the point-to-point serial transmission path CC1 that the error is detected. The digital protection and control device 1 monitors the frequency of the retransmission of the command and error notification by receiving this answer. The digital protection and control device 1 also locks the transmission of the control command to the corresponding component control device 3-1 and notifies the occurrence of the defect to the monitoring server (Z4 in FIG. 2) of the station bus S-NET.

This embodiment is applicable to all the structures exemplified in the first embodiment and the second embodiment.
(Characteristics of Twelfth Embodiment)

In the conventional structure not depending on the transmission medium (FIG. 1), information is transmitted between the digital protection and control device and the component control devices by ON/OFF of the voltage of the point-to-point metal wire, as described in the tenth embodiment and the eleventh embodiment. In this case, since the control command is transmitted by ON/OFF of the voltage of the wire, the same number of voltage ON/OFF sections and the metal wires as that of the control commands are required. In this embodiment, however, the transmission medium is applied and all the control commands can be expressed as commands with the plural bits so that information transmission to the component control devices with one communication path for transmission is possible.

Here, since the voltage application to the point-to-point metal wire is replaced by the signal communication as a method of information transmission, a large volume of information can be transmitted, but on the other hand, it becomes more important to keep communication quality.

The quality of a communication medium can be kept by taking measures such as the use of the noise-proof Manchester code transmission, the error check code or sequence, or the like.

However, when a defect in signal quality occurs on a stage prior to the generation of the error check code, a defective signal is transmitted as it is to the component control device and the receiving side cannot check the defect of the signal. This may possibly result in a risk of erroneous operation or erroneous non-operation of control output.

In order to prevent this situation, adoptable is such a method that the control command from the digital protection and control device is constituted based on a predetermined rule and the component control device being the final receiving side confirms that the command is based on this rule, thereby judging whether or not the command has any error. Through a series of this process, data quality of control command transmission can be maintained.
(Thirteenth Embodiment)

A thirteenth embodiment will be explained with reference to FIG. 26. Sensor units and digital data merging devices are omitted in the drawing.

This drawing shows a transmission route of a control signal from a digital protection and control device 1E connected to a process bus P-NET1 to a component control device 3-1-P, in a substation equipment system in which a plurality of digital data merging devices, a plurality of component control devices, and a plurality of protection and control devices are connected by the process bus P-NET1.

In the digital protection and control device 1E, the protection and control unit 12 and the process bus communication unit 11 are connected by the parallel bus P-BUS, and neither the communication unit 14 for component control devices nor the digital data merging unit 13 is provided. Such a digital protection and control device 1E is connected to the component control device 3-1-P via the process bus P-NET1. This structure is the same as that shown in FIG. 2.

Here, the process bus P-NET1 is constituted of a HUB (HR) for coupling buses, a router (HR) or the like for controlling the transmission direction based on a destination address, and transmission cables.

In the component control device 3-1-P, a process bus communication unit 315 and a drive control unit 312 are connected by the internal bus PD. The structure and operation from the drive control unit 312 to a control output Y are the same as those in the twelfth embodiment.

This process bus communication unit 315 has substantially the same configuration as that of the process bus communication unit 11 of the digital protection and control device 1E.
(Operation of Thirteenth Embodiment)

Figure 26:
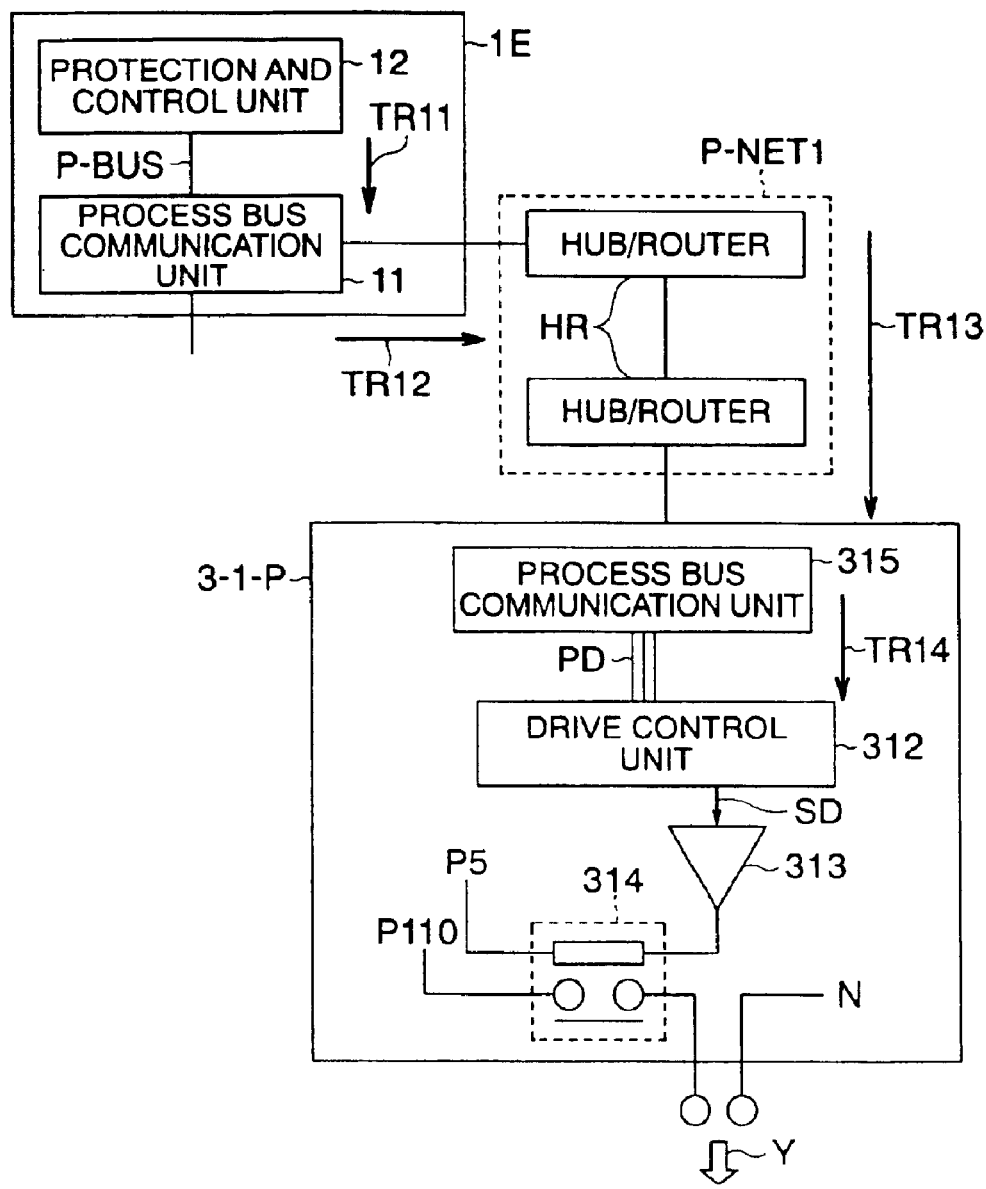
FIG. 26 is a diagram for explaining a transmission route of a control command in a thirteenth embodiment.

The transmission route of the control command (circuit breaker open/close command and the like in accordance with fault detection and selection-and-control) in FIG. 26, unlike that in FIG. 25, passes through the process bus P-NET1. The route is summarized as follows.

from the protection and control unit 12 to the process bus communication unit 11: the arrow TR11 from the process bus communication unit 11 to the process bus P-NET1: the arrow TR12 in the process bus P-NET: the arrow TR13 from the process bus communication unit 315 to the drive control unit 312: the arrow TR14

As described above, since the route passes through several units and transmission paths from TR11 to TR14, data quality of the command expressing the control command with a plurality of bits is very important. When there are several units and transmission paths from the transmitting end to the final receiving end, an occurrence rate of bit errors in the command due to a defect (including a temporal defect) in a part of these units and transmission paths increases. As a result, the rate of the control output signal Y being erroneous on the final stage is increased due to the command including an error bit.

In order to avoid this situation, it is possible to adopt such a method that the command is constituted based on a predetermined rule in, for example, the protection and control unit 12 in the digital protection and control device 1E and the drive control unit 312 on the final stage executes error check based on the aforesaid rule. A method of error check and processing is the same as that in the twelfth embodiment. Note that the command error is notified to the digital protection and control device 1E via the process bus P-NET1 in this embodiment.

(Characteristics of Thirteenth Embodiment)

This embodiment has the same characteristics as those of the twelfth embodiment, but it is especially characterized in that the control command from the protection or control device to the component control device is transmitted via the process bus P-NET1. A communication interconnecting apparatus such as a router or a HUB also exists therebetween. Therefore, this embodiment makes it possible to maintain data quality of the control command all through the route from the transmitting end of the control command to the final receiving end (component control device) thereof.

(Summary of Characteristics of First to Thirteenth Embodiments)

According to the above-described embodiments, it is possible to eliminate an analog input/output circuit which is used for transmission to/from the substation main equipment and which has conventionally been mounted in the protection and control device, and all the input and output are transmitted via the transmission medium. Therefore, no circuit to handle a large volume of voltage and current exists so that hardware can be constituted only of a digital arithmetic processing section to process the protection and control function and a communication section to execute a communication process. As a result, great reduction in hardware, in other words, the downsizing of the device and great reduction in the number of electric cables are made possible.

The downsizing of the device facilitates the assembly of the device into the substation main equipment. Further, the digital arithmetic processor is provided in each unit for digitalization so that self-diagnosis of each unit and the substation main equipment becomes possible. Moreover, the units are coupled to one another via the transmission medium so that effective use of various kinds of information becomes possible to remarkably improve maintainability, operability, and economical efficiency.

Further, the protection and control unit is coupled to a part or all of the digital data merging unit, the communication unit for component control devices, and the process bus communication unit by the common or individual parallel transmission medium(s) so that the speed of information transmission in the digital protection and control device can be increased. This facilitates securing of the realtime performance of protection, monitoring, and control of the substation main equipment.

Further, in the digital protection and control device having the protection and control unit, the digital data merging unit, the communication unit for component control devices, and the process bus communication unit, it is possible to improve performance specs such as time performance of protection and control and fault response behavior that are required as a device.

This application is based upon and claims the benefit of priority from the prior Japanese Patent Application No. 2002-229102 filed on Aug. 6, 2002; the entire contents of which are incorporated herein by reference.

What is claimed is:

1. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a multimaster mode; and at least parts of said digital data merging unit, said protection/control unit, said communication unit for component control device, and said process bus communication unit have a storage section that stores data and that is allocated to a storage space of a bus coupling at least said parts to each other, and data exchange between at least said parts is conducted in such a manner that data is transferred to the storage section based on the allocation.

2. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a single master mode.

3. A digital protection/control device as set forth in claim 1, wherein:

a transmission bus coupling said digital data merging unit, said protection/control unit, said communication unit for component control devices, and said process bus communication unit to one another, and a transmission bus in said process bus communication unit are based on a common transmission mode, and the transmission bus in said process bus communication unit has a bridge.

4. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a multimaster mode; and said protection/control unit executes a protective relay arithmetic operation based on a reference signal for protective relay arithmetic operation whose period is substantially integer times a period of a sampling signal used by said sensor unit(s) for sampling detection of the AC electricity quantities.

5. A digital protection/control device as set forth in claim 4, further comprising:

a unit configured to generate a reference signal for time synchronization synchronous with a reference signal used for generating the sampling signal and to generate the reference signal for protective relay arithmetic operation, wherein:

at least a part of the control over said substation main equipment is synchronized with the reference signal for time synchronization, and at least a part of the protection of said substation main equipment is synchronized with the reference signal for protective relay arithmetic operation.

6. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a multimaster mode; and said protection/control unit transmits said control signal with a predetermined period synchronized with a processing period of protecting or controlling in said protection/control unit to said component control device, and said component control device monitors status event of said substation main equipment by a sampling synchronized with a timing at which said component control device receives the control signal.

7. A digital protection/control device as set forth in claim 6, wherein:

said protection/control unit cyclically appends identification data to said control signal transmitted with the predetermined period, and said component control device generates a timing in accordance with presence or non-presence of the appending of the identification data to the received control signal and controls said substation main equipment at said timing.

8. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

an input/output unit for component control devices which is not adaptable to the digitization of a transmission medium, configured to transmit to said protection/control unit component monitor data outputted from one component control device or a plurality of component control devices controlling said substation main equipment, and to output the control signal outputted from said protection/control unit to said component control device(s), and has a mechanical or static relay section configured to ON/OFF output the control signal to said component control and an insulated input section configured to ON/OFF input said data input thereto from said component control device;

a process bus communication unit configured to relay data to/from at least a part of said protection/control unit, said input/output unit for component control devices, and said digital data merging unit from/to an external process bus; and p1 a parallel transmission medium configured to couple at least parts of said digital data merging unit, said protection/control unit, said input/output unit for component control devices, and said process bus communication unit to one another, wherein:

data exchange among at least parts of said digital data merging unit, said protection/control unit, said input/output unit for component control devices, and said process bus communication unit is based on a multimaster mode.

9. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a multimaster mode; and said digital protection/control device is coupled to an external input/output device by a transmission medium, and exchange data with said component control device via said input/output device, the input/output device including a mechanical or static relay section ON/OFF outputting the control command to said component control device and an insulated input section ON/OFF inputting thereto data input from said component control device.

10. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a multimaster mode; and at least a part of a transmission path of said digital protection/control device is constituted of an optical transmission portion, said digital protection/control device further comprising:

a fan unit configured to send an air to said optical transmission portion under a predetermined condition.

11. A digital protection/control device, comprising:

a digital data merging unit configured to take in, via a transmission medium, digital output from one sensor unit or a plurality of sensor units detecting AC electricity quantities of main circuits of substation main equipment and to merge the inputted digital data;

a protection/control unit configured to output a control signal for at least one of protection and control of said substation main equipment based on the digital data outputted from said digital data merging unit;

a communication unit for component control devices configured to transmit to said protection/control unit component monitor data outputted from one component control device or a plurality of component control devices controlling said substation main equipment, and to transmit the control signal outputted from said protection/control unit to said component control device(s), the component monitor data and the control signal being transmitted via a transmission medium;

a process bus communication unit configured to relay data to/from at least a part of said protection/control unit, said communication unit for component control devices, and said digital data merging unit from/to an external process bus; and a parallel transmission medium configured to couple at least parts of said digital data merging unit, said protection/control unit, said communication unit for component control devices, and said process bus communication unit to one another, wherein:

data exchange among at least parts of said digital data merging unit, said protection/control unit, said communication unit for component control devices, and said process bus communication unit is based on a multimaster mode; and the control signal to said component control device from said digital protection/control device is a command constituted of a plurality of bits and constituted based on a predetermined rule, and said component control device receiving the command detects an error in the command.

12. A digital protection/control device as set forth in claim 1, wherein:

said protection/control unit has both of a protection function and a control function.

* * * * *